(12) United States Patent
Bradley et al.

(10) Patent No.: US 11,847,047 B2
(45) Date of Patent: *Dec. 19, 2023

(54) MOVABLE PLATFORM AND ACTUATING ATTACHMENT

(71) Applicant: Innovative Logistics, LLC, Fort Smith, AR (US)

(72) Inventors: Mark Bradley, Fort Smith, AR (US); Stonie Hopkins, Fort Smith, AR (US); Jefferson Maldonado, Fort Smith, AR (US); Doug Hutchens, Fort Smith, AR (US); Jerry Wade, Fort Smith, AR (US)

(73) Assignee: INNOVATIVE LOGISTICS, LLC, Fort Smith, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,837

(22) Filed: Nov. 18, 2022

(65) Prior Publication Data

US 2023/0081129 A1 Mar. 16, 2023

Related U.S. Application Data

(63) Continuation of application No. 17/203,137, filed on Mar. 16, 2021, now Pat. No. 11,513,943, which is a
(Continued)

(51) Int. Cl.
*G06F 11/36* (2006.01)
*B65D 19/42* (2006.01)
(Continued)

(52) U.S. Cl.
CPC .......... *G06F 11/3688* (2013.01); *B62B 3/002* (2013.01); *B65D 19/003* (2013.01);
(Continued)

(58) Field of Classification Search
CPC .......... B65D 19/42; B65D 2519/00273; B65D 2519/00781; B65D 2519/00786
(Continued)

(56) References Cited

U.S. PATENT DOCUMENTS

| 2,678,139 A | 5/1954 | Gildersleeve |
| 3,667,635 A | 6/1972 | Hackney |

(Continued)

FOREIGN PATENT DOCUMENTS

| CA | 2144886 A1 | 9/1996 |
| CN | 102874510 A | 1/2013 |

(Continued)

OTHER PUBLICATIONS

Written Opinion of the International Preliminary Examining Authority dated Nov. 15, 2018, for International Application No. PCT/US2017/059254, 7 sheets.
(Continued)

*Primary Examiner* — Peter G Leigh
(74) *Attorney, Agent, or Firm* — KATTEN MUCHIN ROSENMAN LLP

(57) ABSTRACT

Disclosed herein is a movable platform (MP) for moving freight during cross-dock operations. The MP comprises a mechanical actuation assembly used to deploy a plurality of roller assemblies used for moving the MP. Also disclosed is an actuating attachment used to deploy the mechanical actuation assembly of the MP. The actuating attachment can be attached to a conveyance vehicle, such as a forklift, or built in to an automated guided vehicle.

8 Claims, 45 Drawing Sheets

Related U.S. Application Data continuation of application No. 16/874,510, filed on May 14, 2020, now abandoned, which is a continuation of application No. 16/142,673, filed on Sep. 26, 2018, now Pat. No. 10,654,616, which is a continuation of application No. 15/799,194, filed on Oct. 31, 2017, now Pat. No. 10,124,927.

(60) Provisional application No. 62/414,952, filed on Oct. 31, 2016.

(51) Int. Cl.
  *B65D 19/00* (2006.01)
  *B62B 3/00* (2006.01)
  *B65D 88/12* (2006.01)
  *G06F 9/54* (2006.01)
  *G06F 11/30* (2006.01)

(52) U.S. Cl.
  CPC .............. *B65D 19/42* (2013.01); *B65D 88/12* (2013.01); *B65D 88/129* (2013.01); *G06F 9/54* (2013.01); *G06F 11/302* (2013.01); *G06F 11/3684* (2013.01); *G06F 11/3692* (2013.01); *B65D 2519/00273* (2013.01); *B65D 2519/00781* (2013.01); *B65D 2519/00786* (2013.01)

(58) Field of Classification Search
  USPC ........................................................ 717/124
  See application file for complete search history.

(56) References Cited

U.S. PATENT DOCUMENTS

| | | | |
|---|---|---|---|
| 3,938,678 A | 2/1976 | Kern | |
| 4,073,369 A | 2/1978 | Nordskog | |
| 4,231,695 A | 11/1980 | Weston, Sr. | |
| 4,886,286 A | 12/1989 | Whorton, III | |
| 5,011,358 A | 4/1991 | Anderson et al. | |
| 5,257,794 A | 11/1993 | Nakamura | |
| 5,454,672 A | 10/1995 | Halpin et al. | |
| 5,799,585 A | 9/1998 | Brennan, Jr. et al. | |
| 5,890,695 A | 4/1999 | Brewer, III | |
| 6,527,572 B2 | 3/2003 | Jou | |
| 6,529,797 B2 | 3/2003 | Williams et al. | |
| 6,575,686 B2 | 6/2003 | Hagenzieker | |
| 6,669,089 B2 | 12/2003 | Cybulski et al. | |
| 6,698,655 B2 | 3/2004 | Kondo et al. | |
| 7,030,760 B1 | 4/2006 | Brown | |
| 7,101,139 B1 | 9/2006 | Benedict | |
| 7,327,262 B2 | 2/2008 | Motteram et al. | |
| 7,603,299 B1 | 10/2009 | Dewey, Jr. et al. | |
| 7,739,147 B2 | 6/2010 | Branigan et al. | |
| 7,742,745 B2 | 6/2010 | Twitchell, Jr. | |
| 7,826,920 B2 | 11/2010 | Stevens et al. | |
| 7,891,675 B2 | 2/2011 | Dobra et al. | |
| 7,991,505 B2 | 8/2011 | Lert, Jr. et al. | |
| 8,006,985 B2 | 8/2011 | Facey | |
| 8,016,300 B2 | 9/2011 | Cramer | |
| 8,292,309 B2 | 10/2012 | Fan | |
| 8,403,344 B2 * | 3/2013 | Carver .................. | B65D 19/42 280/30 |
| 8,442,879 B2 | 5/2013 | Dewey, Jr. et al. | |
| 8,491,240 B2 | 7/2013 | Baker | |
| 8,626,540 B2 | 1/2014 | Peterkofsky et al. | |
| 8,731,708 B2 | 5/2014 | Shakes et al. | |
| 8,744,884 B2 | 6/2014 | Benda et al. | |
| 8,888,109 B2 * | 11/2014 | Stubbs .................. | B65D 19/42 280/30 |
| 8,888,110 B2 * | 11/2014 | Sadeh .................. | B62B 5/0093 280/30 |
| 8,972,045 B1 | 3/2015 | Mountz et al. | |
| 9,045,253 B2 * | 6/2015 | Hacko .................. | B62B 5/049 |
| 9,367,827 B1 | 6/2016 | Lively et al. | |
| 9,950,726 B2 | 4/2018 | Thompson et al. | |
| 10,370,191 B2 | 8/2019 | Galewyrick et al. | |
| 2002/0031418 A1 | 3/2002 | Hagenzieker | |
| 2003/0050819 A1 | 3/2003 | Koenigbauer et al. | |
| 2005/0002766 A1 | 1/2005 | Hartmann et al. | |
| 2005/0071234 A1 | 3/2005 | Schon | |
| 2006/0015532 A1 | 1/2006 | Mizell | |
| 2006/0035500 A1 | 2/2006 | Sugita et al. | |
| 2006/0105603 A1 | 5/2006 | Nishio et al. | |
| 2007/0136079 A1 | 6/2007 | Beykirch et al. | |
| 2007/0156491 A1 | 7/2007 | Schuler et al. | |
| 2007/0174148 A1 | 7/2007 | Schuler et al. | |
| 2007/0186827 A1 | 8/2007 | Loftus et al. | |
| 2007/0279224 A1 | 12/2007 | Branigan et al. | |
| 2008/0103944 A1 | 5/2008 | Hagemann et al. | |
| 2008/0167817 A1 | 7/2008 | Hessler et al. | |
| 2009/0236809 A1 | 9/2009 | Carver et al. | |
| 2009/0267770 A1 | 10/2009 | Twitchell, Jr. | |
| 2010/0108760 A1 | 5/2010 | Eccleston | |
| 2010/0147341 A1 | 6/2010 | Li | |
| 2010/0187782 A1 | 7/2010 | Facey et al. | |
| 2011/0274523 A1 | 11/2011 | Petalas | |
| 2012/0101956 A1 | 4/2012 | Hyre et al. | |
| 2012/0112904 A1 | 5/2012 | Nagy | |
| 2012/0191272 A1 | 7/2012 | Andersen et al. | |
| 2013/0119523 A1 | 5/2013 | Cheng et al. | |
| 2013/0119623 A1 | 5/2013 | Sadeh et al. | |
| 2014/0277691 A1 | 9/2014 | Jacobus et al. | |
| 2016/0311453 A1 * | 10/2016 | Thompson ............. | B65D 19/42 |

FOREIGN PATENT DOCUMENTS

| | | |
|---|---|---|
| CN | 1102874510 A | 1/2013 |
| CN | 203520452 | 4/2014 |
| DE | 2951271 A1 | 7/1981 |
| DE | 29518266 U1 | 7/1996 |
| DE | 29518266 U1 | 7/1996 |
| EP | 2 845 823 A1 | 3/2015 |
| FR | 891662 A | 3/1944 |
| FR | 891662 A | 3/1944 |
| JP | 07-069458 A | 3/1995 |
| JP | H07-69458 A | 3/1995 |
| KR | 10-2014-0101117 A | 8/2014 |
| KR | 20140101117 A | 8/2014 |
| WO | 2008/111041 A2 | 9/2008 |
| WO | 2008111041 A2 | 9/2008 |
| WO | WO-2008111041 A2 * | 9/2008 .............. B62B 5/049 |

OTHER PUBLICATIONS

The extended European search report dated Mar. 26, 2020, from EP 19214546.4. 6 sheets.

Canadian Office Action dated Jan. 8, 2021, from Canadian Application No. 3,053,521, 3 sheets.

Non-Final Rejection dated Sep. 17, 2020, from U.S. Appl. No. 16/874,510, 75 sheets.

Notice of Allowance dated Aug. 30, 2022, from U.S. Appl. No. 17/203,137, 20 sheets.

Notice of Allowance dated Jul. 27, 2022, from U.S. Appl. No. 17/203,137, 25 sheets.

Notice of Allowance dated Jul. 18, 2022, from U.S. Appl. No. 17/203,137, 80 sheets.

Notice of Allowance dated Jan. 3, 2020, from related U.S. Appl. No. 16/142,673.

International Preliminary Report on Patentability dated Feb. 7, 2019, for International Application No. PCT/US2017/059264, 64 sheets.

Non-Final Office Action dated Jul. 20, 2020, from U.S. Appl. No. 16/454,129, 32 sheets.

International Search Report and Written Opinion dated May 30, 2018, from the corresponding International Application No. PCT/US2018/019178, 15 sheets.

Extended European search report dated Apr. 23, 2018, for European Patent Application No. 15870857.8, 6 sheets.

Office Action dated Oct. 29, 2018, from U.S. Appl. No. 15/902,421.

(56) References Cited

OTHER PUBLICATIONS

H&M Bay Deploys RFID solution at cross-docketing distribution center, RFID24-7Com, Mar. 30, 2010.

3PL Adds Customer Value with RFID, Sato Eueope, Megatrux, Inc., Rancho Cucamonga, California.

"Maida Napolitano", Contributing editor, Crossdocking: The latest and greatest, Article from Logistics Management, MMH Editorial, Apr. 1, 2010.

K. Choy, et. al., Cross-dock job assignment problem in space-constrained industrial logistics distribution hubs with a single docking zone, Taylor & Francis Online, International Journal of Production Research, vol. 50, Issue 9,2012, Special Issue: International logistics systems: theory and applications.

G. Miragliotta, et. al., A quantitative model for tire introduction of RFId in the fast moving consumer goods supply chain: Are there any profits?, International Journal of Operations & Production Management, ISSN: 0144-3577, Online from 1980, Subject Area: Management Science & Operations.

J Wang, et al., Real-time trailer scheduling for crossdock operations, Transportation Journal 47.2, (Apr. 2008-Jun. 2008): 5(16).

Transmittal; International Search Report; and the Written Opinion of the International Searching Authority for International Application No. PCT/US2015/065775 dated Mar. 30, 2016.

Notice of Allowance dated Aug. 24, 2018, from U.S. Appl. No. 15/799,194.

Notice of Allowance dated Jul. 19, 2018, from U.S. Appl. No. 15/799,194.

Notice of Allowance dated Jun. 28, 2018, from U.S. Appl. No. 15/799,194.

Official Action dated Feb. 28, 2022, from Mexican Patent Application No. MX/a/2019/009956 I, 3 sheets.

International Search Report and Written Opinion dated Jul. 13, 2018, from International Application No. PCT/US2017/059264, 15 sheets.

\* cited by examiner

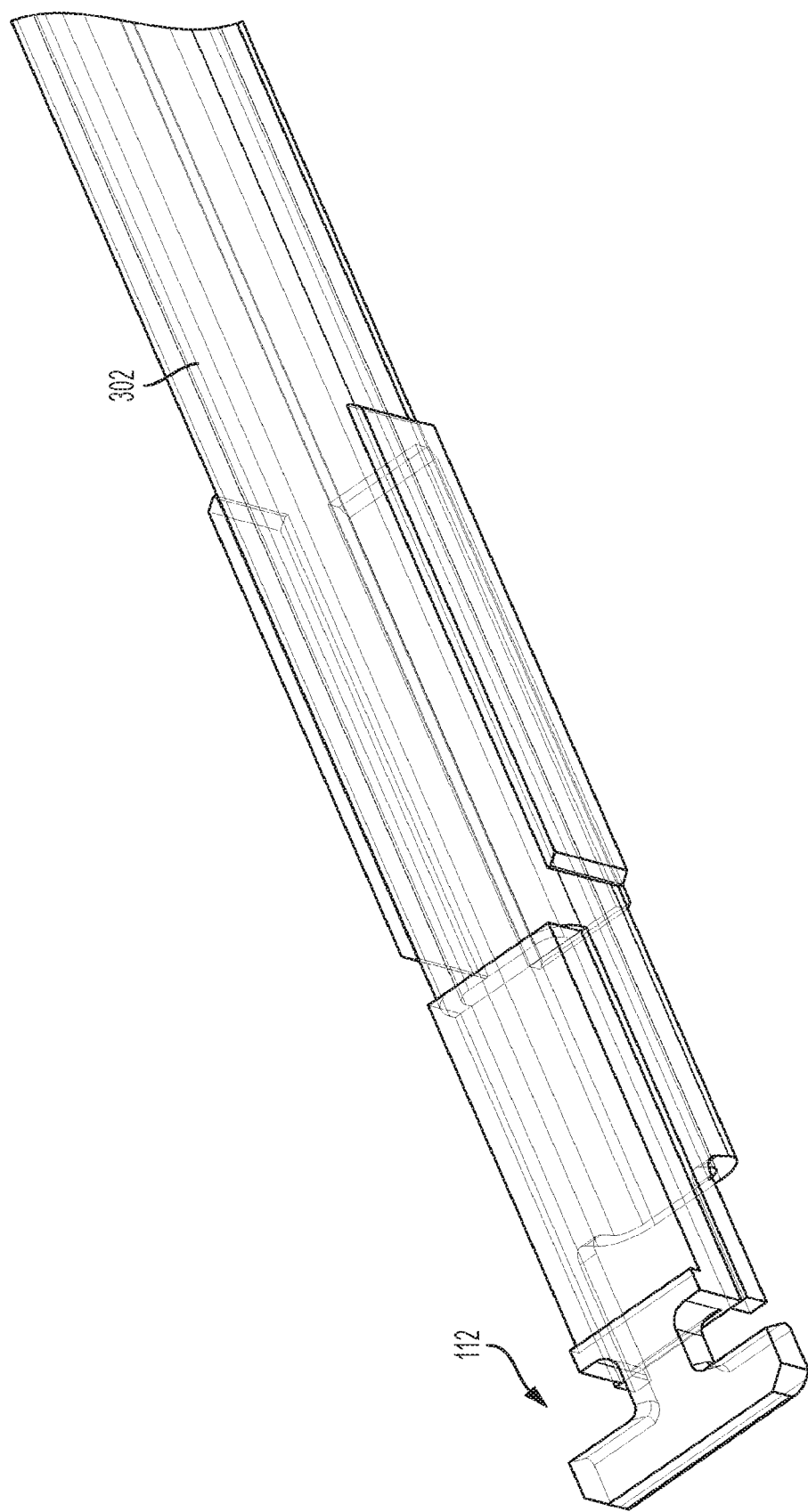

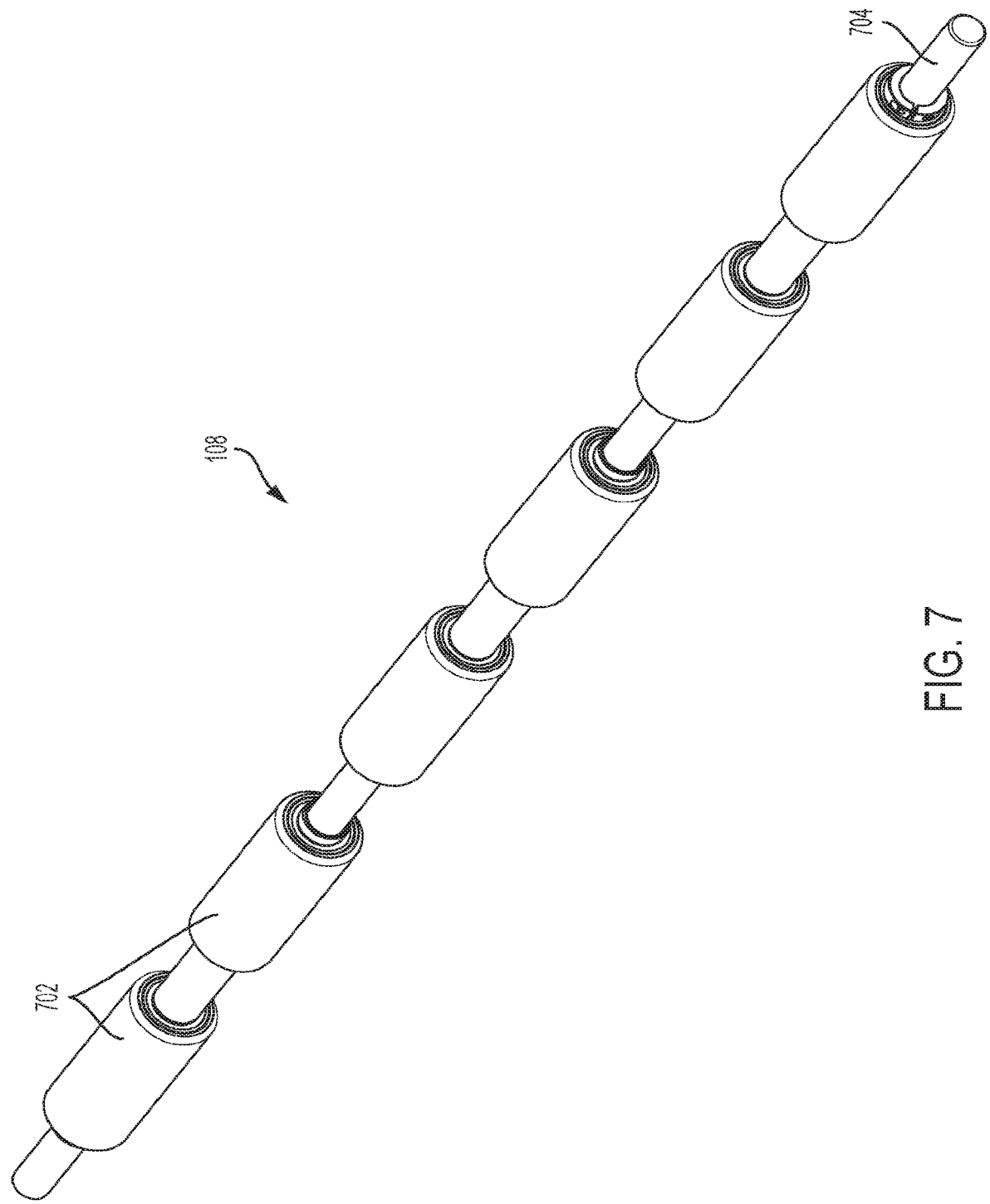

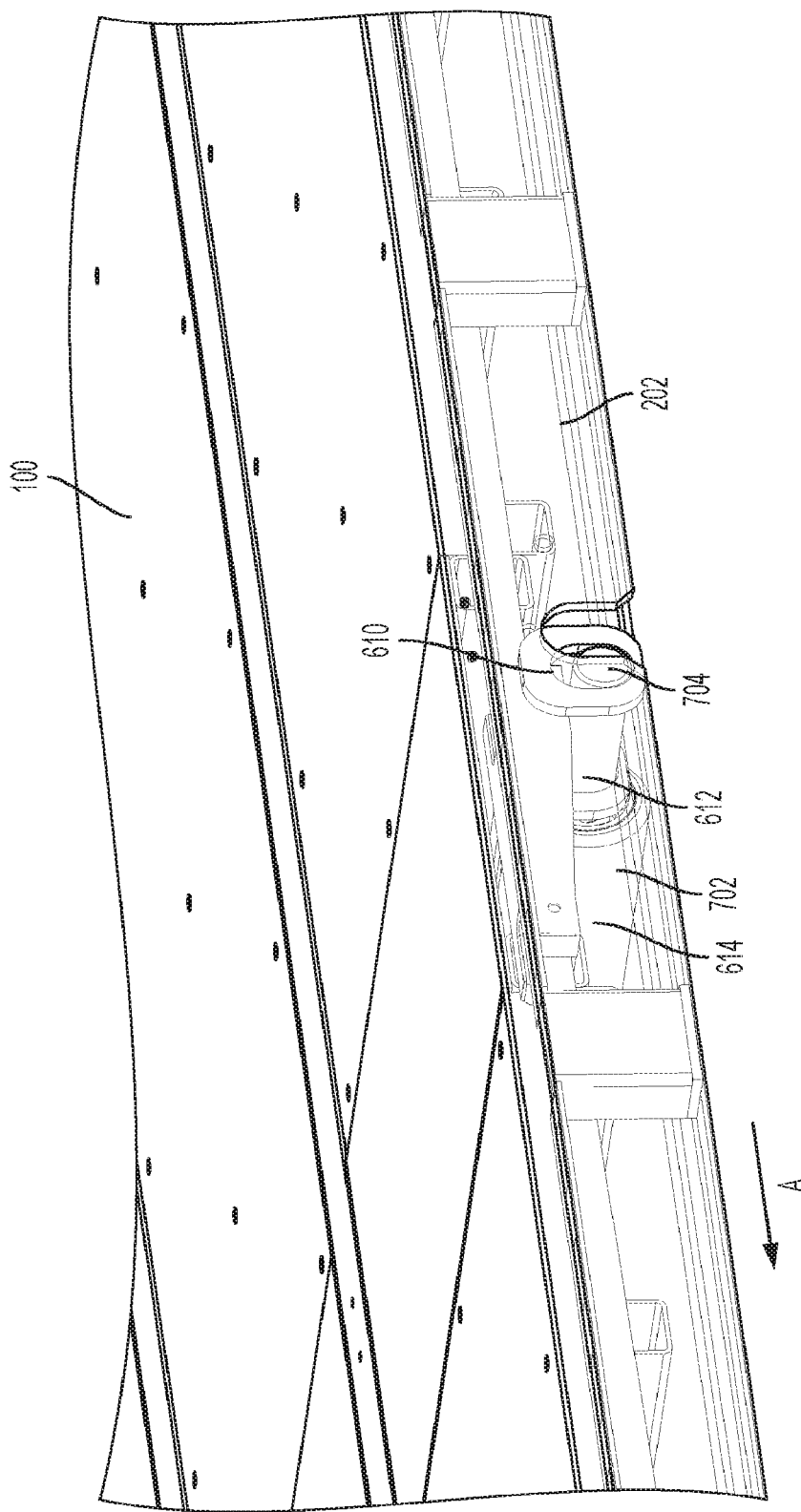

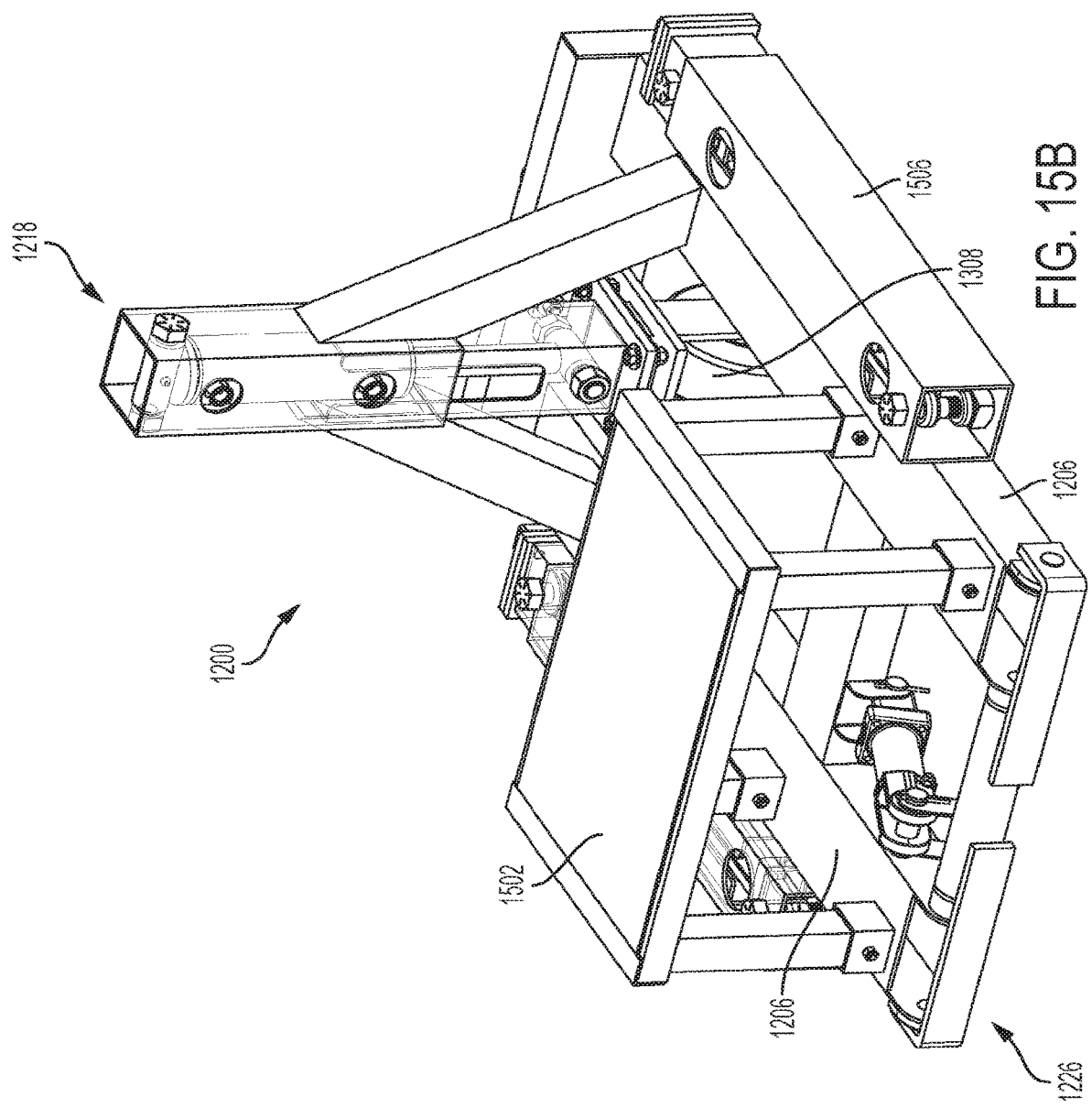

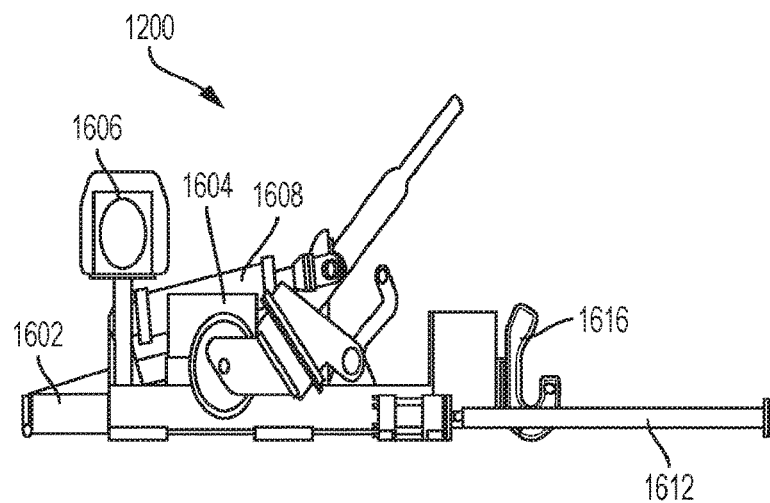
FIG. 16F
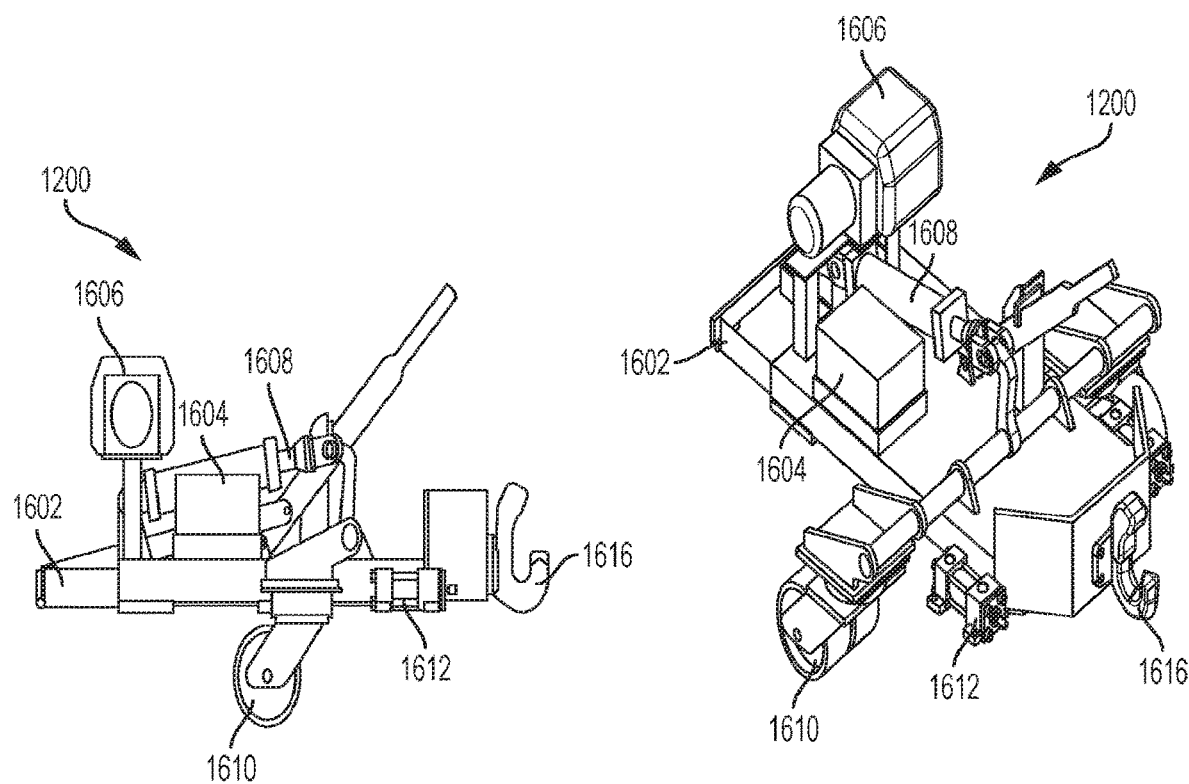
FIG. 16G
FIG. 16H

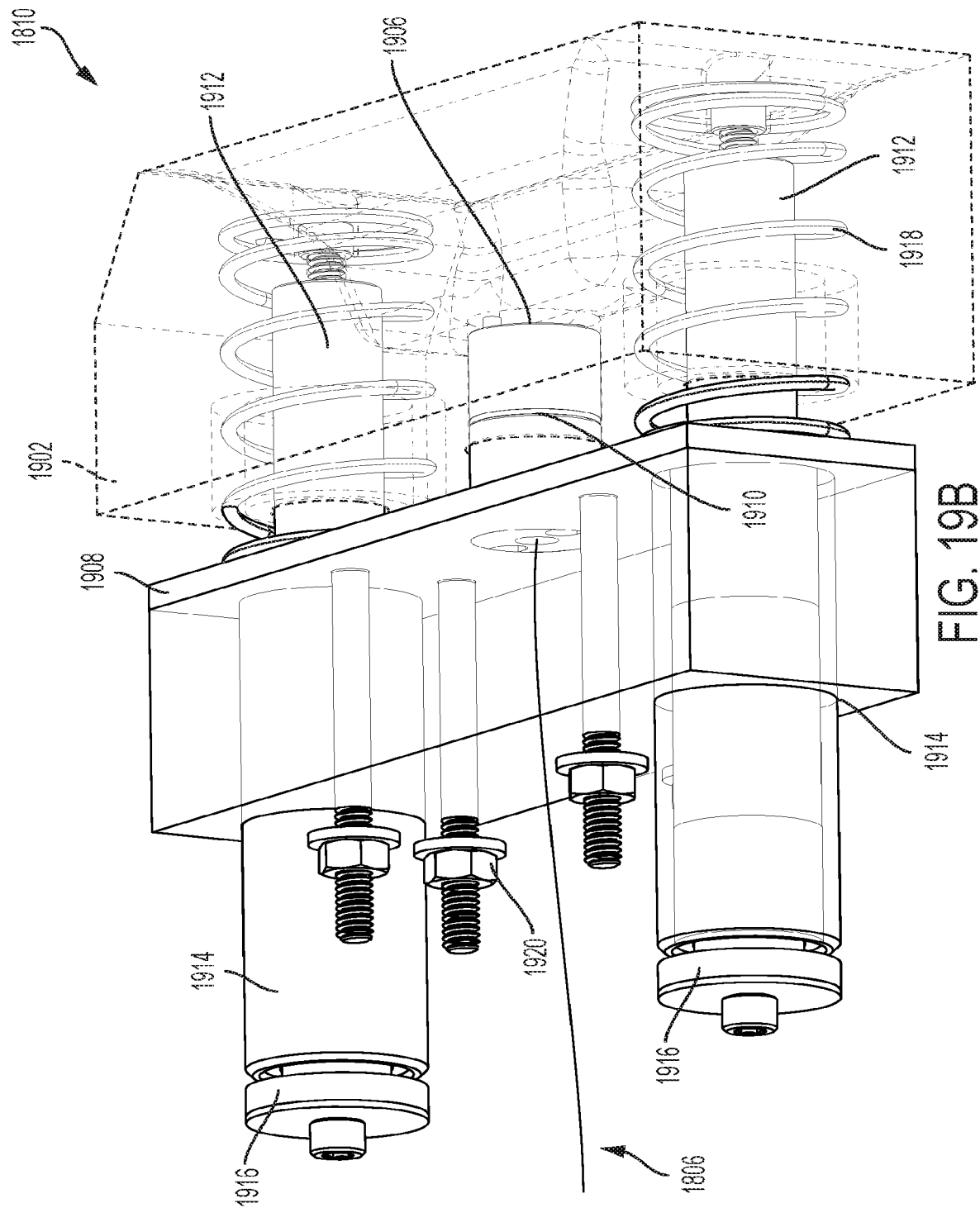

MOVABLE PLATFORM AND ACTUATING ATTACHMENT

CROSS-REFERENCE TO RELATED APPLICATIONS

This application is a continuation of U.S. patent application Ser. No. 17/203,137, filed Mar. 16, 2021, which is a continuation of U.S. patent application Ser. No. 16/874,510, filed May 14, 2020, which is a continuation of U.S. patent application Ser. No. 16/142,673, now U.S. Pat. No. 10,654,616, which is a continuation of U.S. patent application Ser. No. 15/799,194, filed Oct. 31, 2017, now U.S. Pat. No. 10,124,927, which claims priority to U.S. Provisional Patent Application Ser. No. 62/414,952, filed Oct. 31, 2016, the entire contents of which are hereby incorporated by reference in their entirety.

FIELD OF THE INVENTION

The present invention provides a movable platform (MP) used to transfer freight in and out of a semi-trailer in one move. More particularly, the present invention provides a mobile MP that can be maneuvered through a warehouse using an actuating attachment.

RELATED APPLICATIONS

The present invention can be utilized in any standard or custom warehouse. Particularly, the MP of the present invention can be utilized with the systems and methods described in related U.S. Pat. No. 9,367,827, issued Jun. 14, 2016.

BACKGROUND

The trucking industry, specifically the segment consisting of Full-Truckload (FTL) and Less-than-truckload (LTL), is a segment of the shipping industry that ships a wide array of freight. The shipment sizes can vary from an individual item consisting of one piece to a full truckload consisting of several pieces. FTL freight is typically handled only once as it is loaded into a semi-trailer at the shipper's location and unloaded at the consignee's location. In the LTL industry, freight is commonly handled multiple times, with the shipper loading the freight into a semi-trailer, then the freight is returned to a local freight terminal to be unloaded/loaded into a another trailer to be routed to the destination. This process, commonly known as a hub-and-spoke network, is used to increase the efficiency of the operation by increasing density.

The traditional method of loading freight into a semi-trailer is to back a semi-trailer to a raised dock and unload each piece/pallet using a forklift. A 53' semi-trailer van can hold up to 30 pallets on the floor of the trailer. To unload a loaded semi-trailer conventionally, it requires a single forklift driver to drive into the trailer to pick-up and remove each pallet. During this unloading process, a driver could take up to 30 trips into the trailer to remove each pallet. This process is typically completed utilizing 1 forklift driver but it is possible to utilize 2 forklift drivers to unload a trailer simultaneously.

As should be apparent, this process is wasteful in that the forklift is often not conveying cargo (empty carries). Also, because the trailer is no connected to the dock, the forklift driver must be careful each time that they enter the trailer. This further reduces the speed of the process. Therefore, there is clearly a need for a movable platform which can be easily unloaded from a trailer in a single move without the forklift driver having to enter the trailer. As will be made apparent in the following disclosure, the present invention provides a solution for these aforementioned problems.

SUMMARY

The present invention provides a MP for moving freight during cross-dock operations. The MP comprises a mechanical actuation assembly used to deploy a plurality of roller assemblies used for moving the MP. Also disclosed is an actuating attachment used to deploy the mechanical actuation assembly of the MP. The actuating attachment can be attached to a conveyance vehicle, such as a forklift, or built in to an automated guided vehicle.

BRIEF DESCRIPTION OF THE DRAWINGS

These and other advantages of the present invention will be readily understood with the reference to the following specifications and attached drawings wherein:

FIG. 4A depicts an enhanced view of the T-bar and drawbar of the mechanical actuation assembly.

FIG. 7 depicts a view of a roller assembly in isolation.

FIG. 11 depicts the actuation of the roller assemblies by the mechanical actuation assembly.

FIGS. 15A-15B depict an alternate embodiment of an actuating attachment.

FIGS. 16A-16H depict a second alternate embodiment of an actuating attachment.

FIGS. 19A-19B depict views of a female quick mate (QM) connector.

DETAILED DESCRIPTION

Preferred embodiments of the present invention will be described herein below with reference to the accompanying drawings. In the following description, well-known functions or constructions are not described in detail because they may obscure the invention in unnecessary detail. While the present invention is generally directed to LTL operations for use in the trucking industry, the teachings may be applied to other shipping industries, just as those by air, sea, and rail. Therefore, the teachings should not be constructed as being limited to only the trucking industry.

Figure 1A:
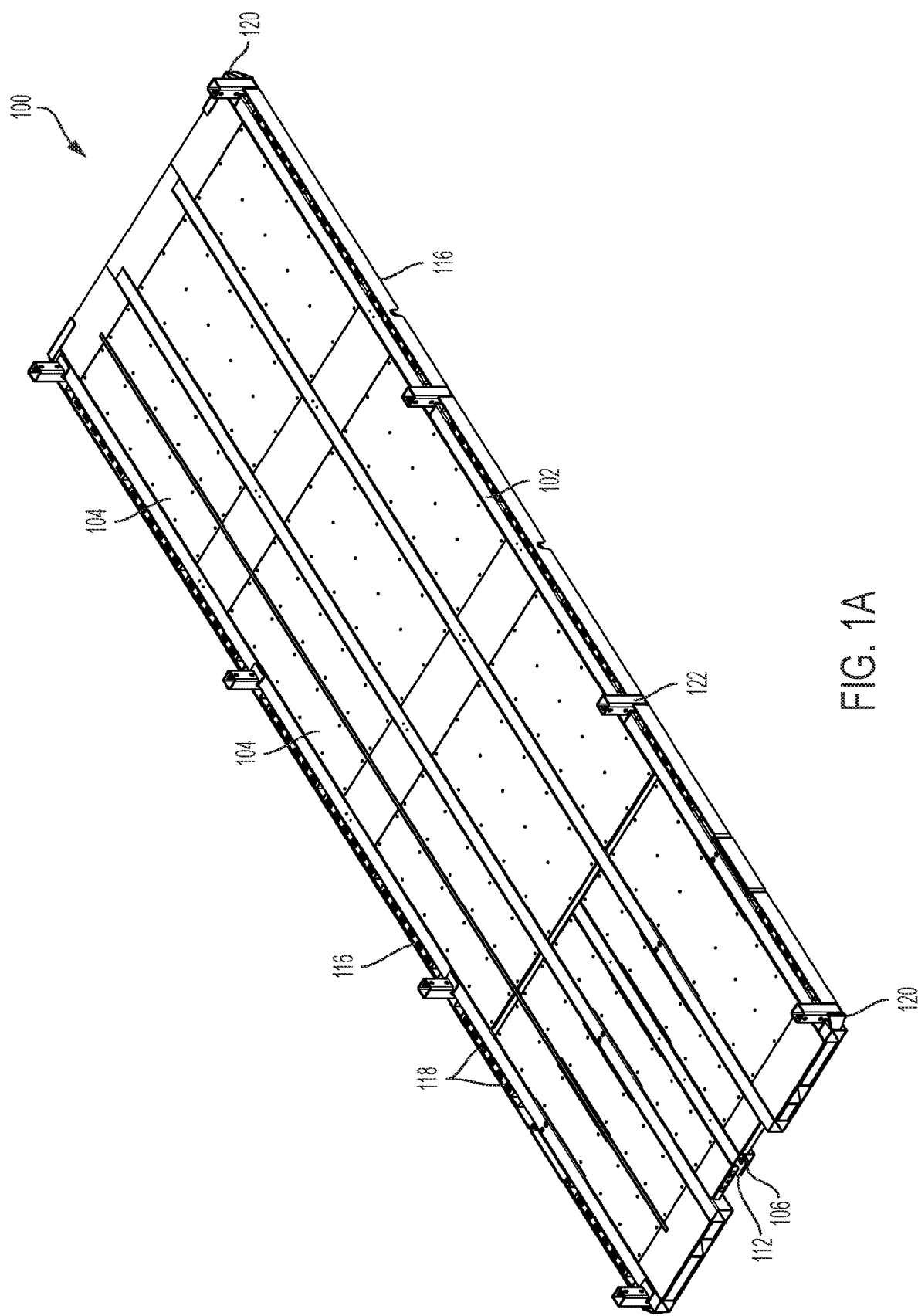
FIG. 1A depicts a perspective view of the movable platform.

Referring first to FIG. 1A, depicted is a perspective view of MP 100 used to convey freight in and out of trailers. Generally, MP 100 comprises frame 102, decking 104, and mechanical actuation assembly 106. MP 100 preferably has a height of 4" or less when resting on the ground and 5" or less when rollers are engaged to limit impact on load capacity in a trailer. MP 100 is designed to be loaded with up to 24,000 pounds of freight. MP 100 can be raised without the forklift operator getting off the forklift via the actuating attachment and vice versa. MP 100 is designed to be conveyed with a standard 4,000 pound capacity forklift to unload/load MP 100 in and out of a trailer. Other conveyance vehicles, such as automated guided vehicles (AGVs), can also be used to automatically convey the MP 100 during cross-dock operations.

Empty MIPs 100 can be stacked up to 8 high in a pup trailer, allowing more economical shipping from the manufacturer or for repositioning of MPs 100 from one hub/spoke to another. Generally, MP 100 is 26' in length, allowing it to fit into a standard pup trailer which has an interior length of 27.5' or two into a van trailer which has an interior length of 52.5'. Preferably, the width of MP 100 can be modified to fit either a roll door trailer or a swing door trailer. It should be apparent to one of ordinary skill in the art that these dimensions can be modified to fit any global standard of trailer or for any custom trailer.

Figure 1B:
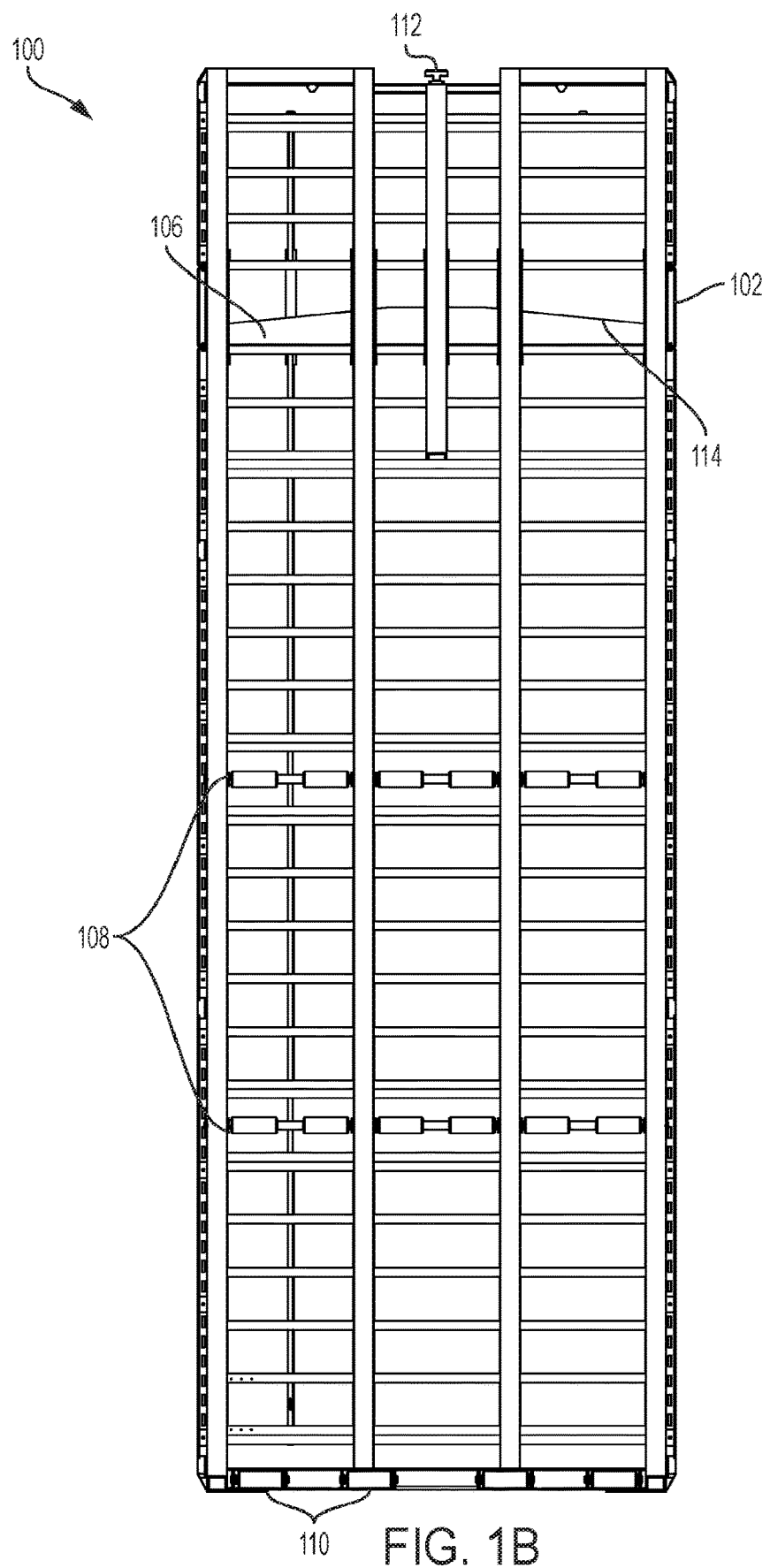
FIG. 1B depicts a bottom view of the MP.

FIG. 1B depicts the underside of MP 100 to show additional features. A plurality of roller assemblies 108 can be raised/lowered by mechanical actuation assembly 106 as will be described later. A rear portion of the MP 100 comprises a plurality of fixed rollers 110 that are always deployed. However, it should be apparent to one of ordinary skill in the art that fixed rollers 110 could be replaced by a roller assembly 108 and connected to mechanical actuation assembly 106.

Frame 102 provides the structural support for MP 100. Frame 102 is mostly constructed from rectangular or square tubular segments which are welded together to form frame 102. Decking 104 is preferably a lightweight material, such as plywood or plastic, which prevents smaller freight from falling through frame 102 when MP 100 is in transport. The frame 102 and decking 104 are designed to allow a standard 4,000 lb. forklift to drive on MP 100 unload/load freight conventionally. It should be apparent that decking 104 may also be a metal mesh or other material if weight of MP 100 is a priority.

Mechanical actuation assembly 106, which will be described in more detail later, is used to raise or lower the roller assemblies 108 of MP 100 by exerting a lateral pulling force on T-bar 112. The majority of mechanical actuation assembly 106 resides within frame 102 and only T-bar 112 is visible from the top view shown in FIG. 1A. FIG. 1B also depicts connection plate 114 which primarily transmits the force from T-bar 112 to the additional components of mechanical actuation assembly 106 located within frame 102.

In some embodiments, frame 102 further comprises rub rail 116 located along the opposing lengthwise edges of frame 102. Rub rail 116 is preferably a ¼" plate raised above the decking 104 which helps to release MP 100 from forklift blades and to prevent freight from shifting. Rub rail 116 may further comprise cutouts 118 along a top or side of rub rails 116. Cutouts 118 can be used to secure freight to MP 100 with straps or webbing.

Adjacent rub rail 116 at the corners of MP 100 are a plurality of bumpers 120 having angled edges (e.g., 45°). Bumpers 120 are preferably replaceable and made from a plastic or other softer material. Bumpers 120 allow for easier loading and unloading of MP 100 by helping to guide MP 100 into and out of a trailer.

Frame 102 may also comprise a plurality of vertical post pockets 122 into which vertical posts (not shown) can be secured. A modular decking system comprising a combination of vertical posts, engagement members, and decks that can be placed on the vertical posts to transport freight is described in U.S. Provisional Application Ser. No. 62/414,967, filed Oct. 31, 2016, the entire content of which is hereby incorporated by reference in its entirety. Vertical post pockets 122 are preferably bolted or welded to an exterior of frame 102

Figure 2A:
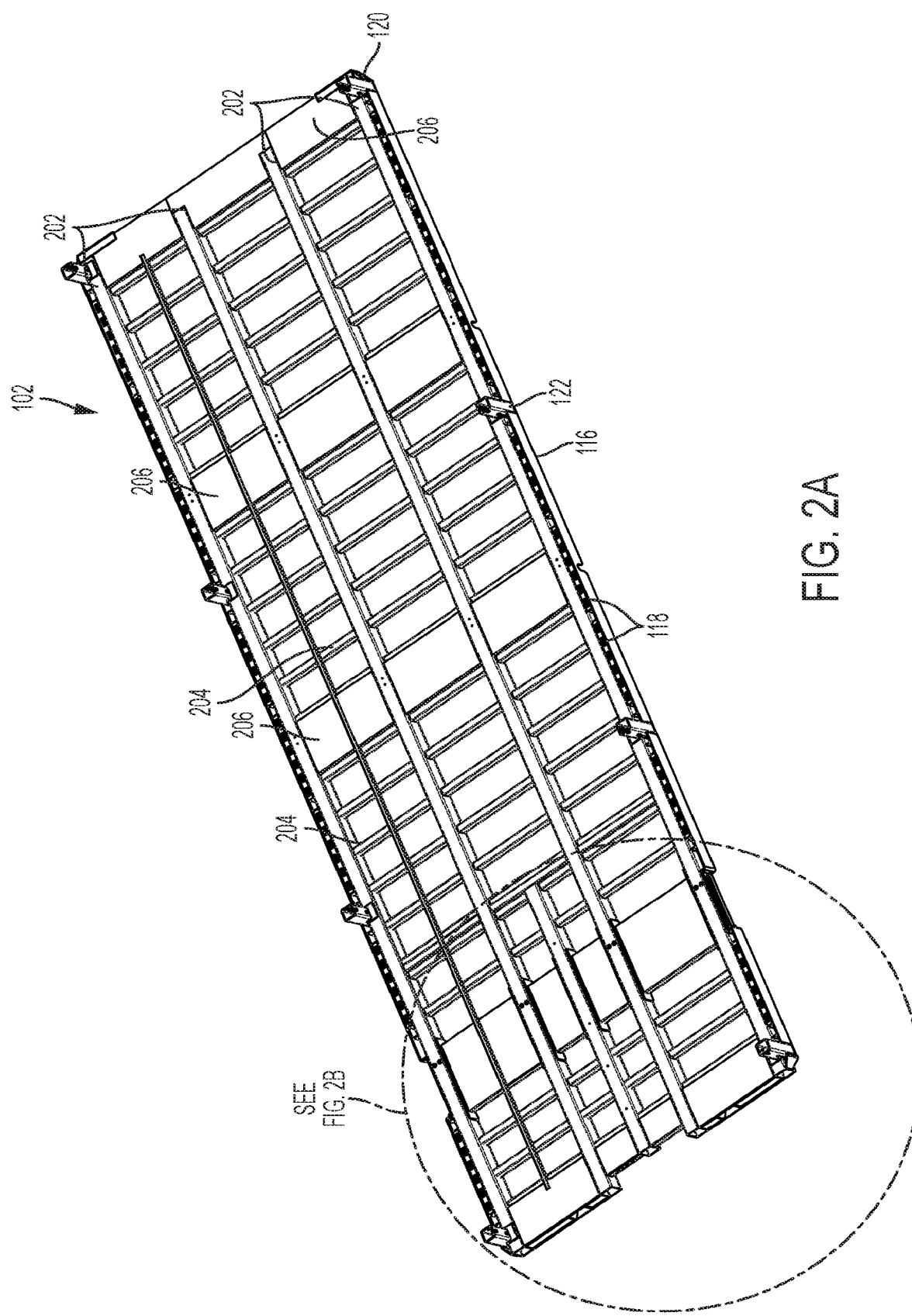
FIG. 2A depicts a perspective view of the frame of the MP.

FIG. 2A depicts a perspective view of the frame 102 shown in isolation without decking 104 or mechanical actuation assembly 106. As depicted in FIG. 2A, frame 102 generally comprises four lengthwise members 202 and a plurality of smaller cross members 204. Lengthwise members 202 and cross members 204 are preferably rectangular or square tubular metal segments which are welded together to form the majority of frame 102.

Frame 102 also comprises three roller covers 206 which cover roller assemblies 108 and fixed rollers 110. A welded or bolted metal covering is preferably used in this section instead of decking 104 to ensure that roller assemblies 108 and fixed rollers 110 do not become damaged when freight is placed on MP 100.

Figure 2B:
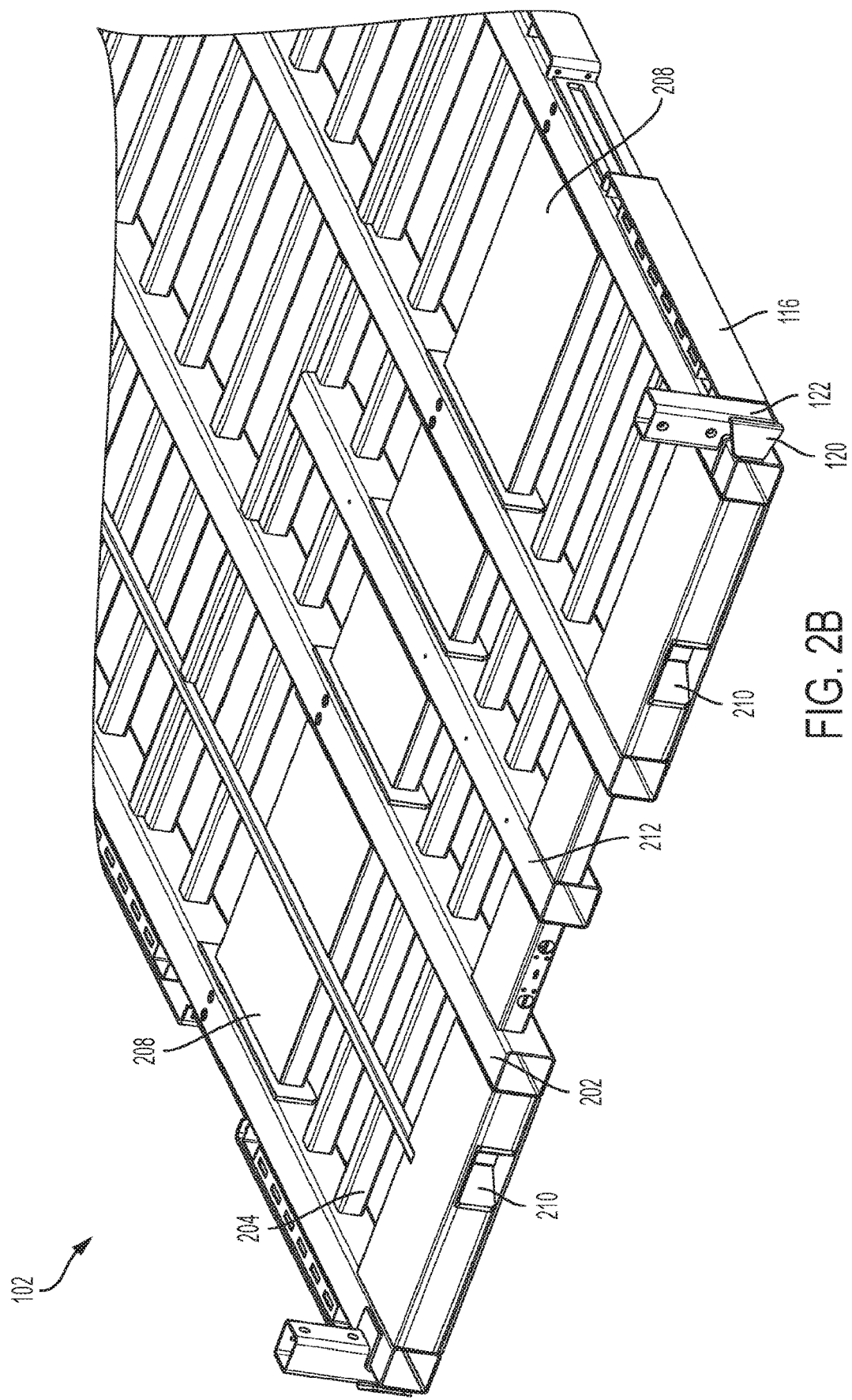
FIG. 2B depicts an enhanced view of the front of the frame of the MP.

FIG. 2B depicts an enhanced view of the front of frame 102. Similar to roller covers 206, connection plate 114 is also covered by connection plate cover 208 to protect mechanical actuation assembly 106. Attachment connectors 210, located on the front surface of frame 102, allow hooks (shown later) of the actuating attachment 1200 to be connected to MP 100. Drawbar post 212 houses the drawbar (shown later) which connects T-bar 112 to connection plate 114.

Figure 2C:
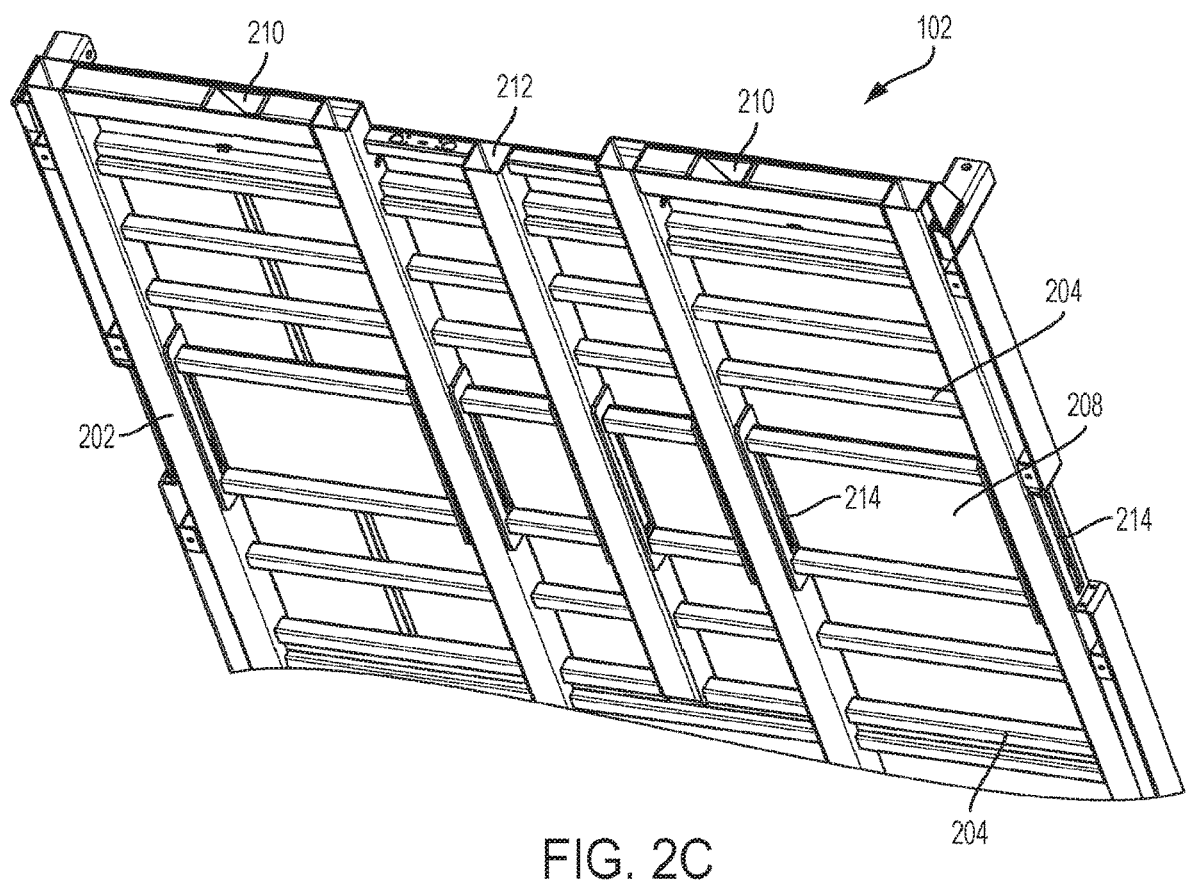
FIG. 2C depicts an enhanced view of the underside of the front of the frame of the MP.

FIG. 2C depicts a bottom view of the front of frame 102. Underneath plate cover 208 are located a plurality of horizontal slots 214 through drawbar post 212 and lengthwise members 202, forming a channel the entire width of MP 100. The length of horizontal slots 214 limits the lateral movement of mechanical actuation assembly 106 by limiting the lateral movement of connection plate 114 within the channel.

Figure 2D:
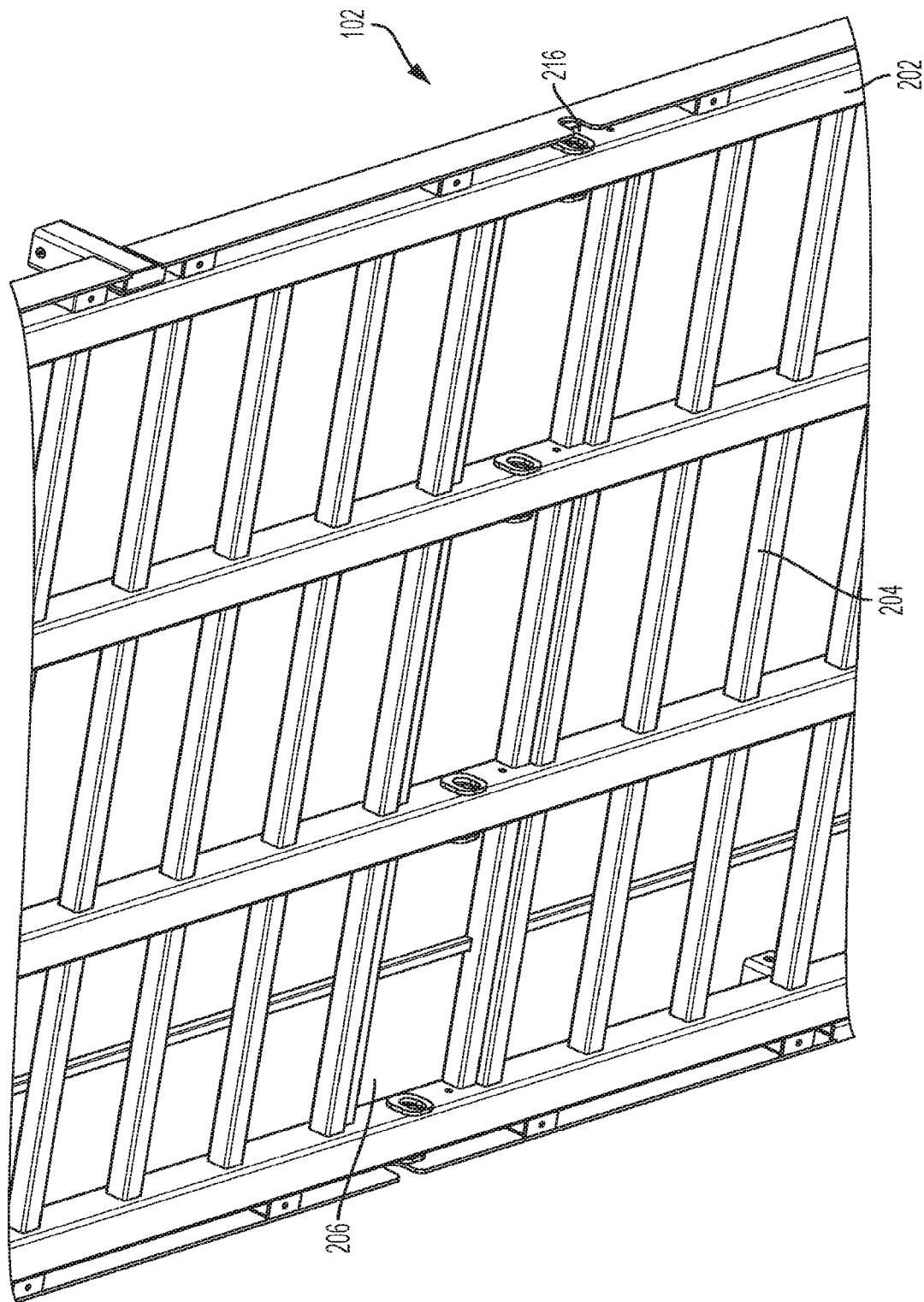
FIG. 2D depicts an enhanced view of the underside of the frame of the MP showing the axel channels.

FIG. 2D depicts the underside of a single roller cover 206. The other roller cover 206 (not shown) has the same construction. Each lengthwise member 202, underneath single roller cover 206, includes axel channels 216 there through for accommodating the axel of roller assembly 108. Axel channels 216 preferably have an obround or stadium shape to allow the circular axel of roller assemblies 108 to move vertically within axel channel 216 as will be shown later.

Figure 2E:
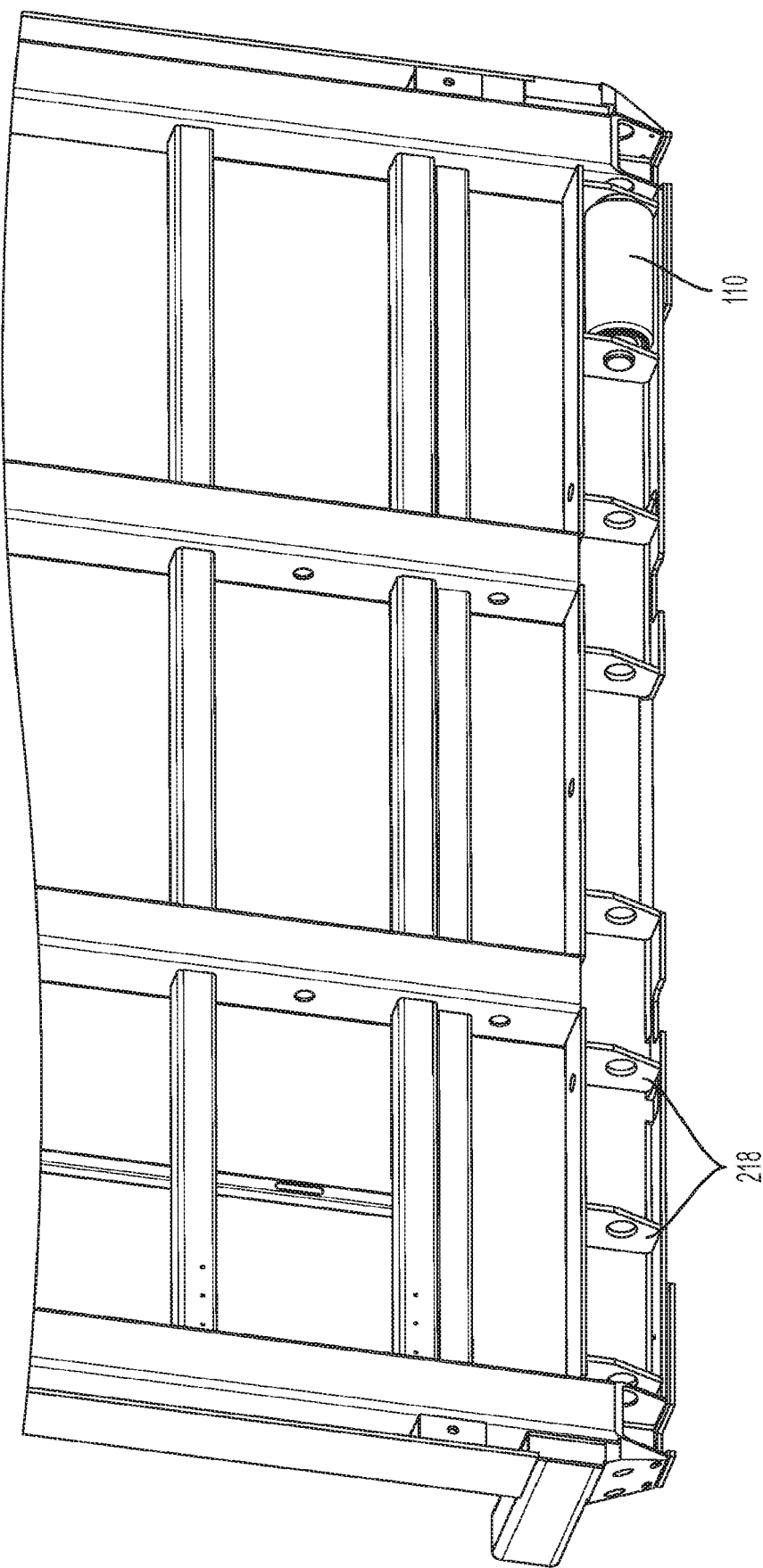
FIG. 2E depicts an enhanced view of the underside of the frame of the MP showing the fixed roller assemblies.

FIG. 2E depicts the rear of the underside of frame 102. For clarity, only a single fixed roller 110 is depicted to show the geometry of fixed roller assembly 218. Each fixed roller assembly 218 is formed from two parallel plates having a hole there through to accommodate a single fixed roller 110 as shown in FIG. 2E.

Figure 2F:
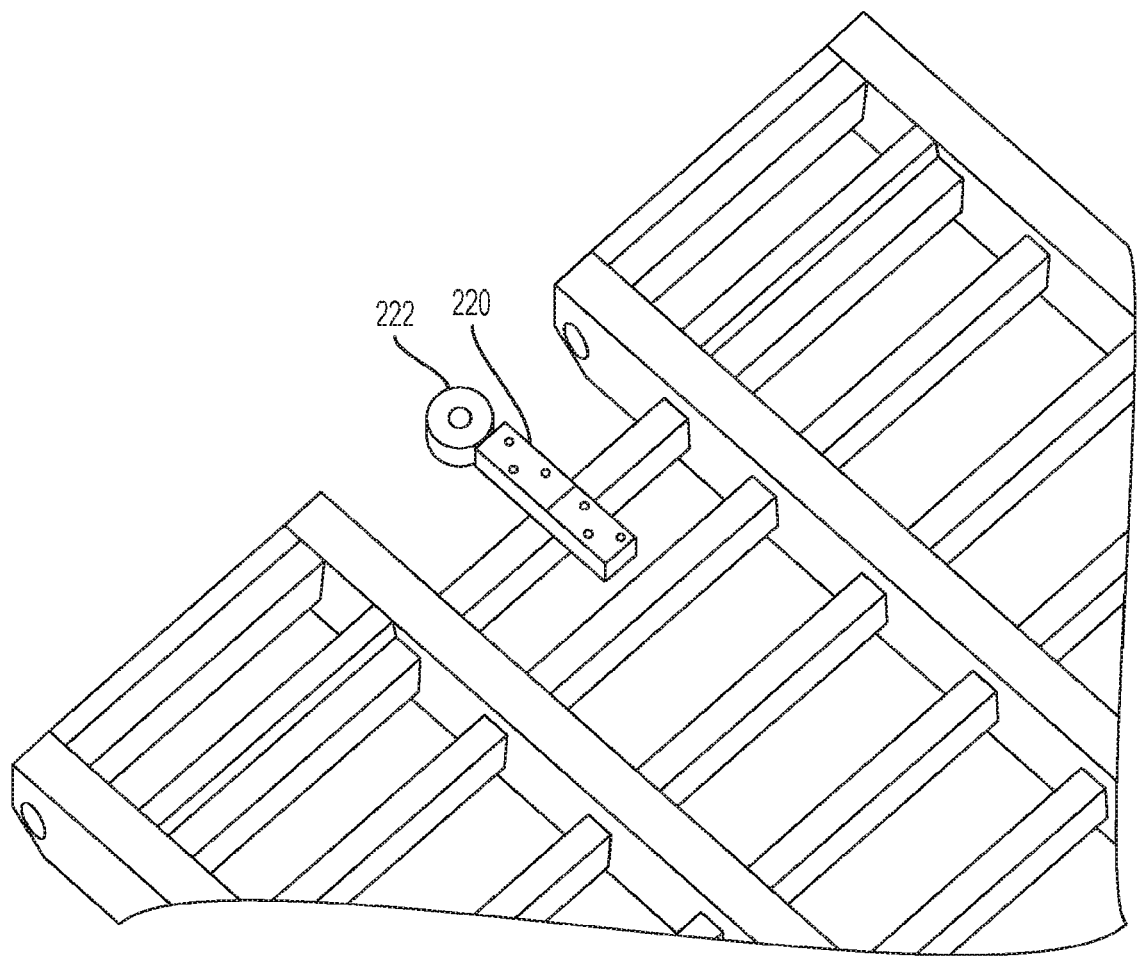
FIG. 2F depicts an alternate embodiment for the rear of the frame of the MP.

FIG. 2F depicts an alternate embodiment for the rear of frame 102. Here, a drawbar 220 connected to a lunette eye 222 (or other attachment) is provided on the rear of frame 102 to help with conveyance of MP 100 and/or to help secure MP 100 in a trailer.

Figure 3:
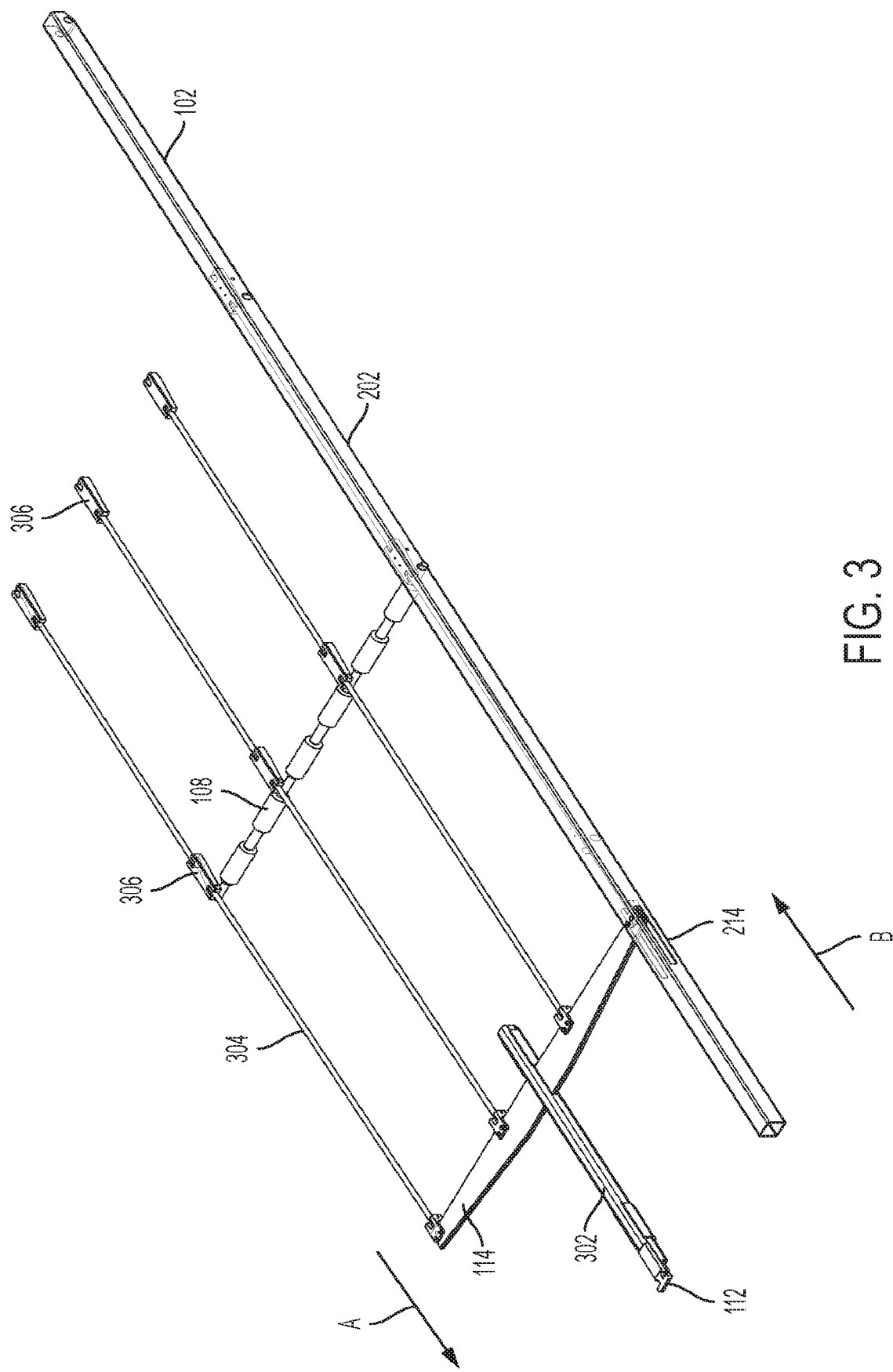
FIG. 3 depicts a view of the mechanical actuation assembly in combination with a portion of the frame.

FIG. 3 depicts a perspective view of the mechanical actuation assembly 106 within a cutaway portion of frame 102. Mechanical actuation assembly 106 generally comprises T-bar 112, drawbar 302, connection plate 114, ramp connectors 304, ramp guides 306, and roller assemblies 108.

Figure 4B:
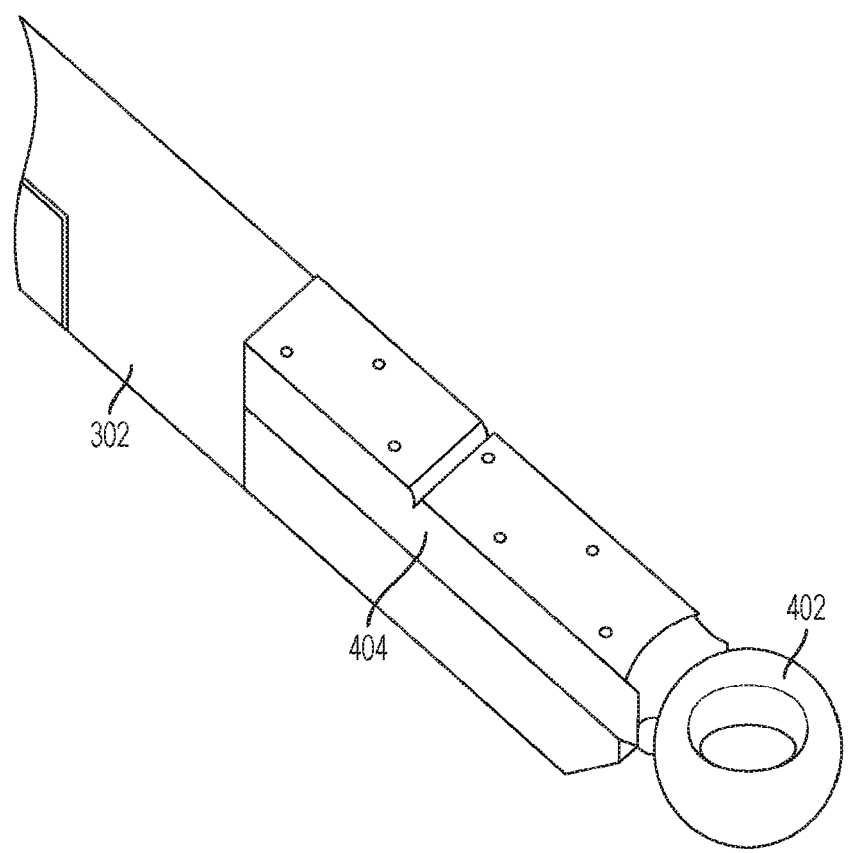
FIG. 4B depicts an alternate embodiment showing a lunette eye attached to the drawbar instead of a T-bar.

FIG. 4A depicts an enhanced view of the connection between T-bar 112 and drawbar 302. T-bar 112 is preferably bolted or welded to drawbar 302. FIG. 4B depicts an alternate embodiment in which T-bar 112 is replaced by lunette eye 402 which is bolted and/or welded onto drawbar 302. In this embodiment, the end of lunette eye 402 has notch 404 (or raised surface) which mates with a corresponding raised surface in drawbar post 212 to maintain mechanical actuation assembly 106 in a deployed position.

Referring back to FIG. 3, drawbar 302 has a cross-section slightly smaller than that of drawbar post 212 to allow drawbar 302 to freely slide from a first position to a second position within drawbar post 212. Connection plate 114 generally has a wing-shaped construction and passes through a center of drawbar 302. The remainder of connection plate 114 passes through slots 214 contained in frame 102 as shown in FIG. 2C.

Figure 5A:
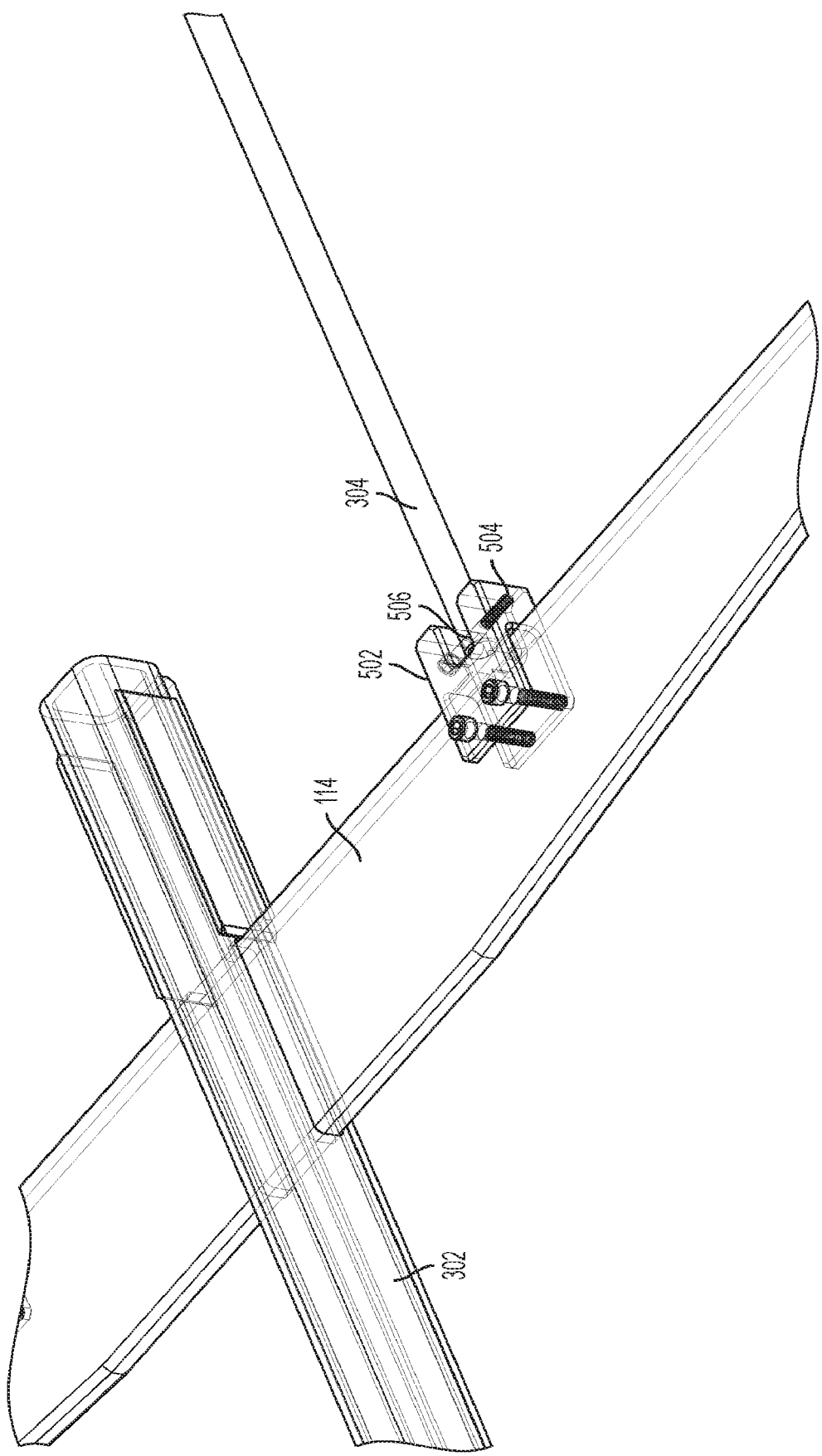
FIG. 5A depicts the connection between the drawbar, the connection plate, and a ramp connector.
Figure 8:
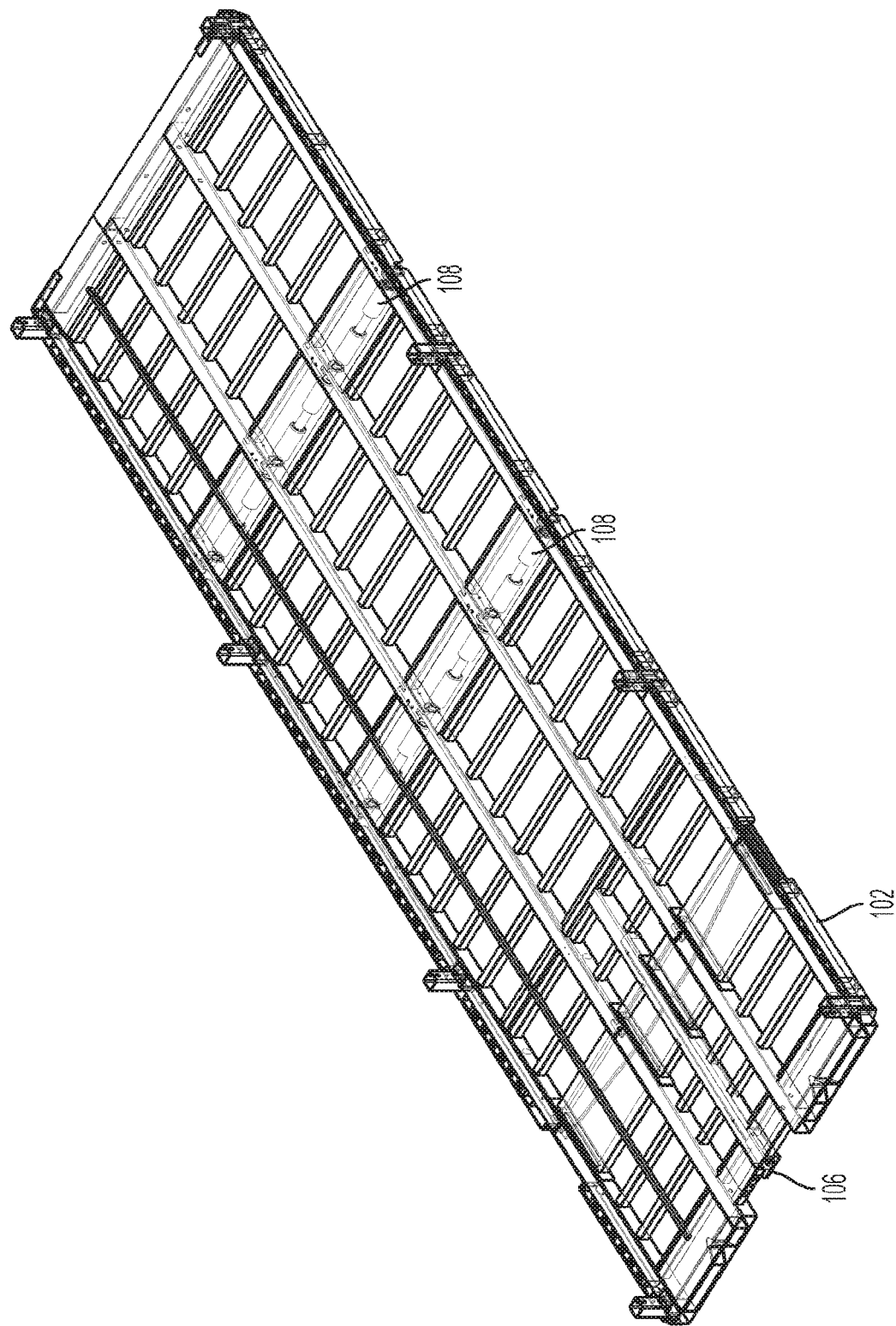
FIG. 8 depicts the positional relationships of the mechanical actuation assembly and roller assemblies within the frame (in phantom).

FIG. 5A depicts the connection between drawbar 302, connection plate 114, and ramp connector 304. As shown, brackets 502 are bolted to connection plate 114. A bolt 504 is then placed through an opening 506 in ramp connector 304. Connection plate 114 contains a total of four brackets 502 for each of the four ramp connectors 304 which are housed in lengthwise posts 202 as depicted in FIGS. 3 and 8.

Figure 5B:
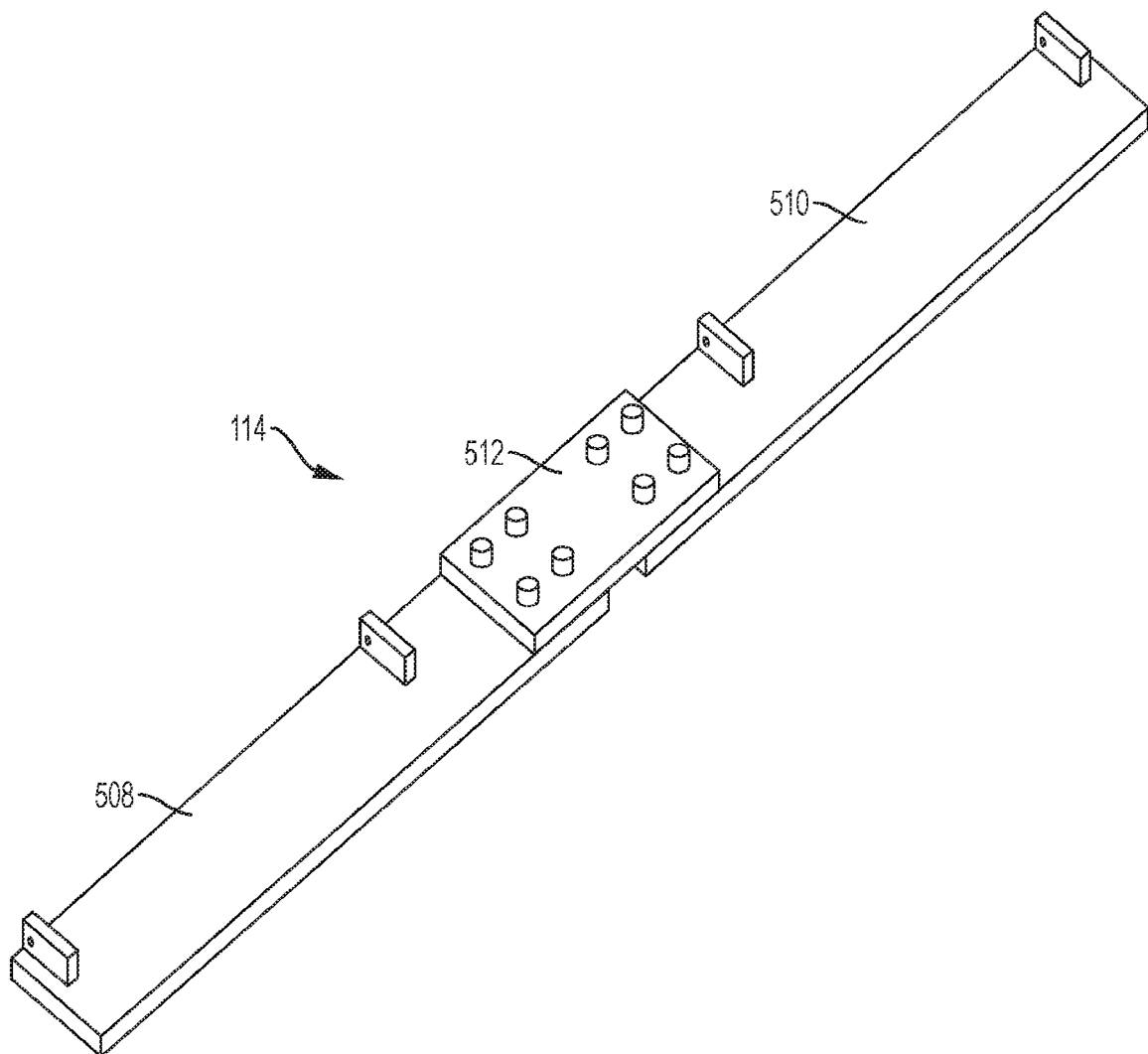
FIG. 5B depicts an alternate construction for the connection plate.

An alternative embodiment of connection plate 114 is depicted in FIG. 5B. In this embodiment, connection plate 114 is formed from first plate 508 and second plate 510 joined together by bolt plate 512.

Figure 6A:
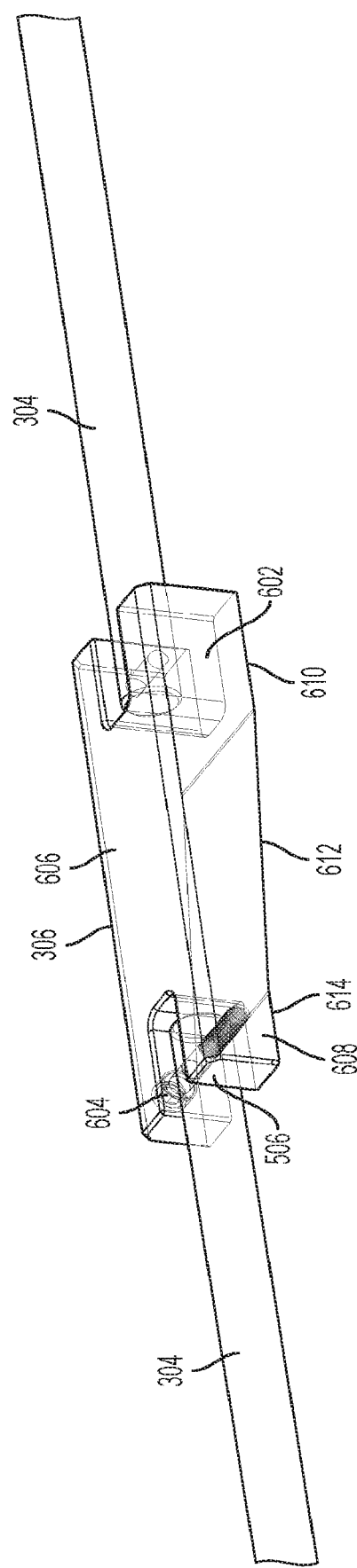
FIG. 6A depicts the connection between the ramp connectors and a ramp guide.

FIG. 6A depicts the connection between two ramp connectors 304 and ramp guide 306. As shown, each end of ramp guide 306 comprises connector openings 602. Ramp connectors 304 are inserted into connector openings 602 and a bolt 604 is passed through opening 506 to connector ramp connector 304 to ramp guide 306. This connection is similar to that between brackets 502 and ramp connector 304 already described.

The upper surface 606 of ramp guide 306 is flat and covered with a lubricant (or coating) so that it can freely slide laterally along the upper inner surface of each lengthwise post 202 as mechanical actuation assembly 106 is actuated. Preferably, the lubricant is Mystik Grease No. 1 manufactured by Mystik® Lubricants.

The lower surface 608 of ramp guide 306 comprises first surface 610, ramp 612, and second surface 614. Ramp 610 is preferably angled 4-6° from the plane of first surface, but more preferably 4.8°. First surface 610 preferably has a total length of 2-3" and second surface 612 preferably has a length of 1-2". Ramp guide 306 preferably has a total height of 1.5-2" at the end adjacent the first surface 610 and a total height of approximately 1-1.5" at the end adjacent the second surface 610. Further, ramp guide 306 preferably has a total width of 2-4", but more preferably 3". As will be depicted later, the axel of roller assembly 108 is located beneath second surface 614 when the mechanical actuation assembly 106 is not deployed and below first surface 610 when the mechanical actuation assembly 106 is deployed.

Figure 6B:
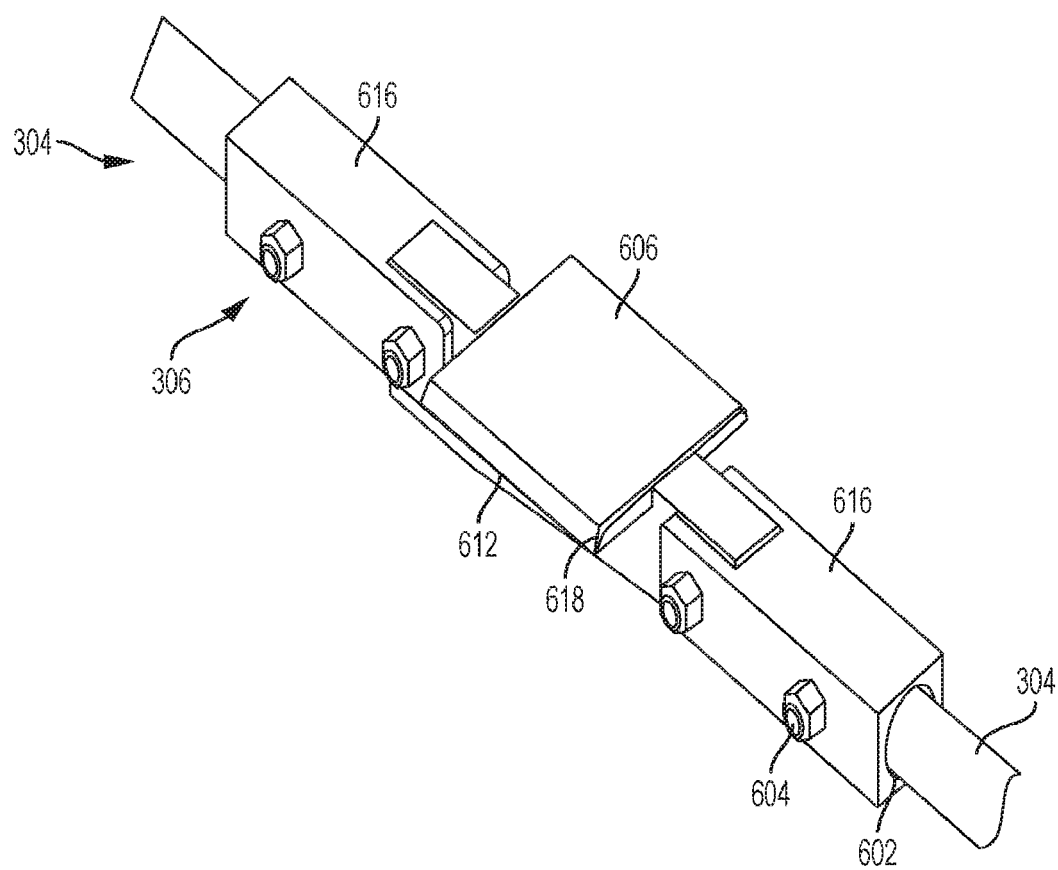
FIG. 6B depicts an alternate construction for the ramp guide.

FIG. 6B depicts an alternate embodiment of ramp guides 306. In this embodiment, the connector openings 602 are provided as bores in connector members 616. Connector members 616 are joined to ramp member 618 via a bolted connection. The lower surface of ramp member 618 contains first surface 610, ramp 612, and second surface 614.

FIG. 7 depicts roller assembly 108 in isolation. Roller assembly 108 generally comprises a plurality of rollers 702 which are evenly spaced about roller axel 704. Each roller 702 can independently rotate about roller axel 704. Roller axel 704 fits through axel channels 216 in frame 102 (FIG. 2D). Because roller axel 704 is circular and axel channels 216 are obround or stadium shaped, the roller axel 704 can move vertically within axel channels 216 to deploy rollers 702. FIG. 8 depicts the positional relationships of mechanical actuation assembly 106 and roller assemblies 108 within frame 102.

Figure 9:
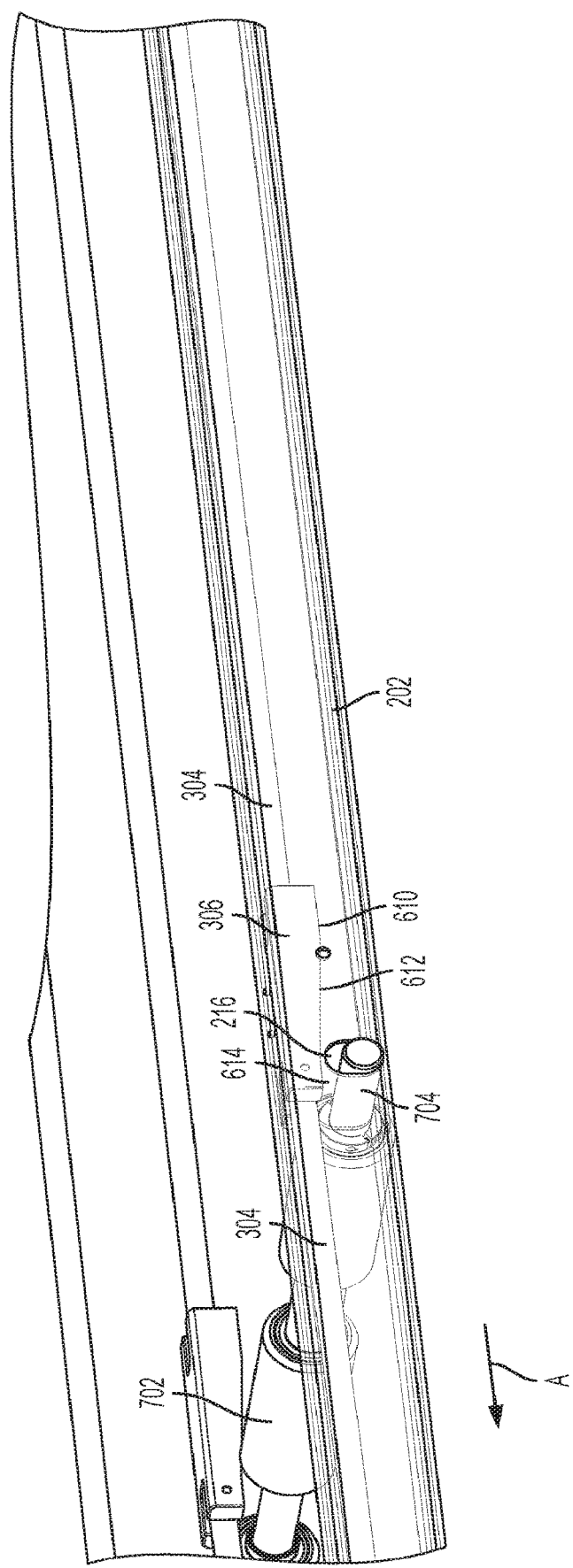
FIG. 9 depicts a lengthwise post to show the positional relation of a ramp guide to a roller axel prior to rollers being deployed.

FIG. 9 depicts a lengthwise post 202 in phantom to show the positional relation of a ramp guide 306 to roller axel 704 prior to rollers 702 being deployed. As shown, second surface 614 is spaced apart from roller axel 704, allowing roller axel 704 and rollers 702 to move up/down within axel channels 216. Thus, when MP 100 is placed on the ground in this configuration, the bottom of rollers 702 are free to become level with a bottom of frame 102, preventing MP 100 from being conveyed.

Figure 10:
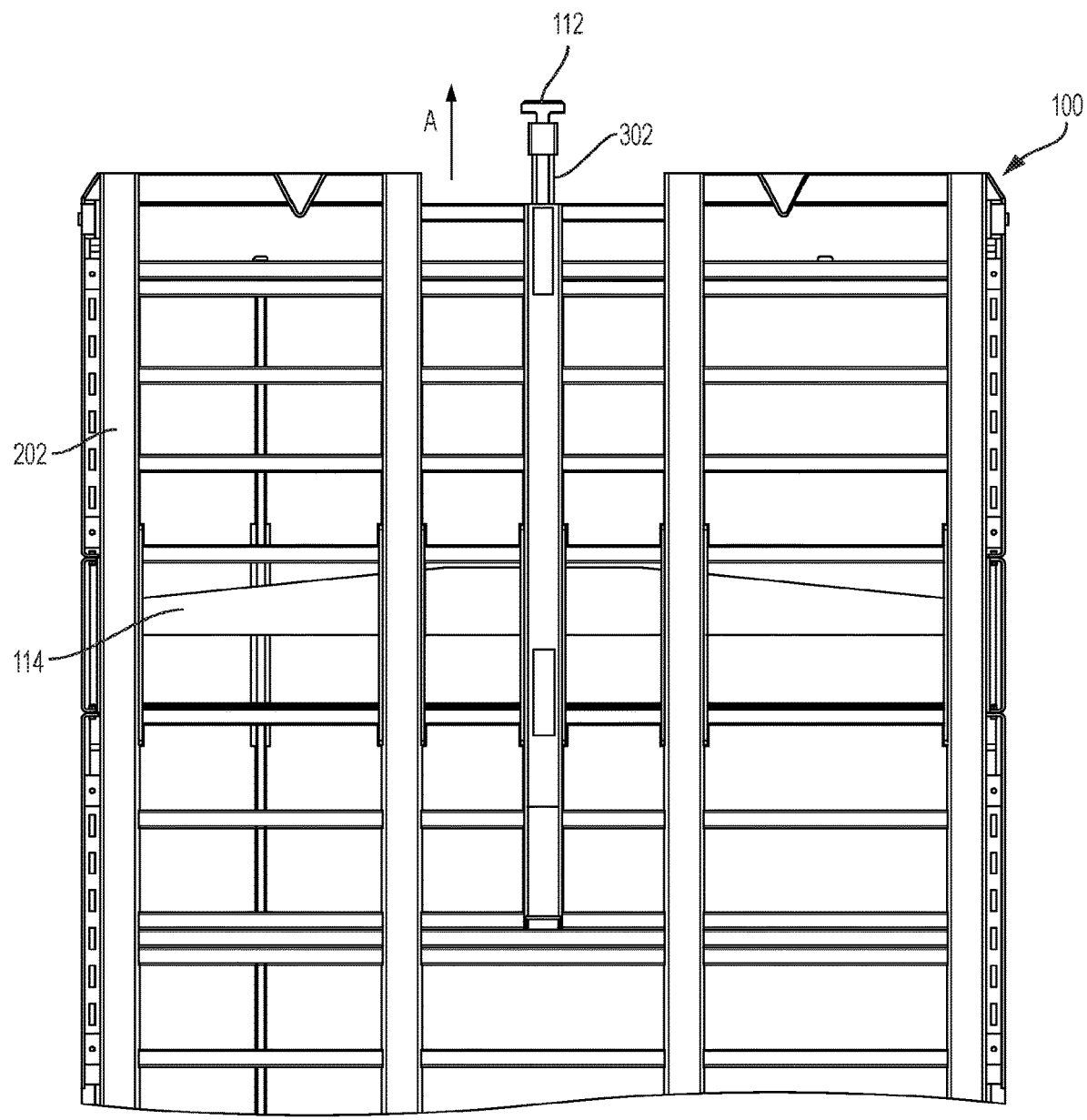
FIG. 10 depicts a bottom view of a front of the MP showing the connection plate moved to a deployed position.

The steps utilized to actuate mechanical actuation assembly 106 will now be described. First, using an actuating attachment to be described later, a lateral force is exerted on T-bar 112 in direction A to move it to the position depicted in FIG. 10. The amount that T-bar 112 can be extended is limited by the width of slots 214 (e.g., the movement of connection plate 114 is limited).

As shown in FIG. 11, the movement of T-bar 112 is translated to each ramp guide 306 through ramp connectors 304 (in each lengthwise post 202), drawbar 302, and connection plate 114. This causes a downward force on roller axel 704 by ramp 612 and second surface 614 as ramp guide 306 is moved forward (in direction A), thus deploying rollers 702. The force on roller axel 704 can be reversed by causing T-bar 112 to move opposite direction A.

Actuating Mechanism

As has been described, a force must be exerted on T-bar 112 in order to deploy rollers 702, allowing MP 100 to be conveyed. To accomplish this, the MP 100 must remain stationary as the force is applied to T-bar 112. Otherwise, the MP 100 will begin rolling forward before rollers 702 are fully deployed. Therefore, described next is an actuating attachment that can be utilized to deploy rollers 702 and convey MP 100 in a warehouse using a standard forklift. The actuating attachment can also be made integral to an AGV to allow for automated moving of MPs 100 as described in U.S. Provisional Application Ser. No. 62/415,054, filed Oct. 31, 2016, the entire content of which is hereby incorporated by reference in its entirety.

Figure 12A:
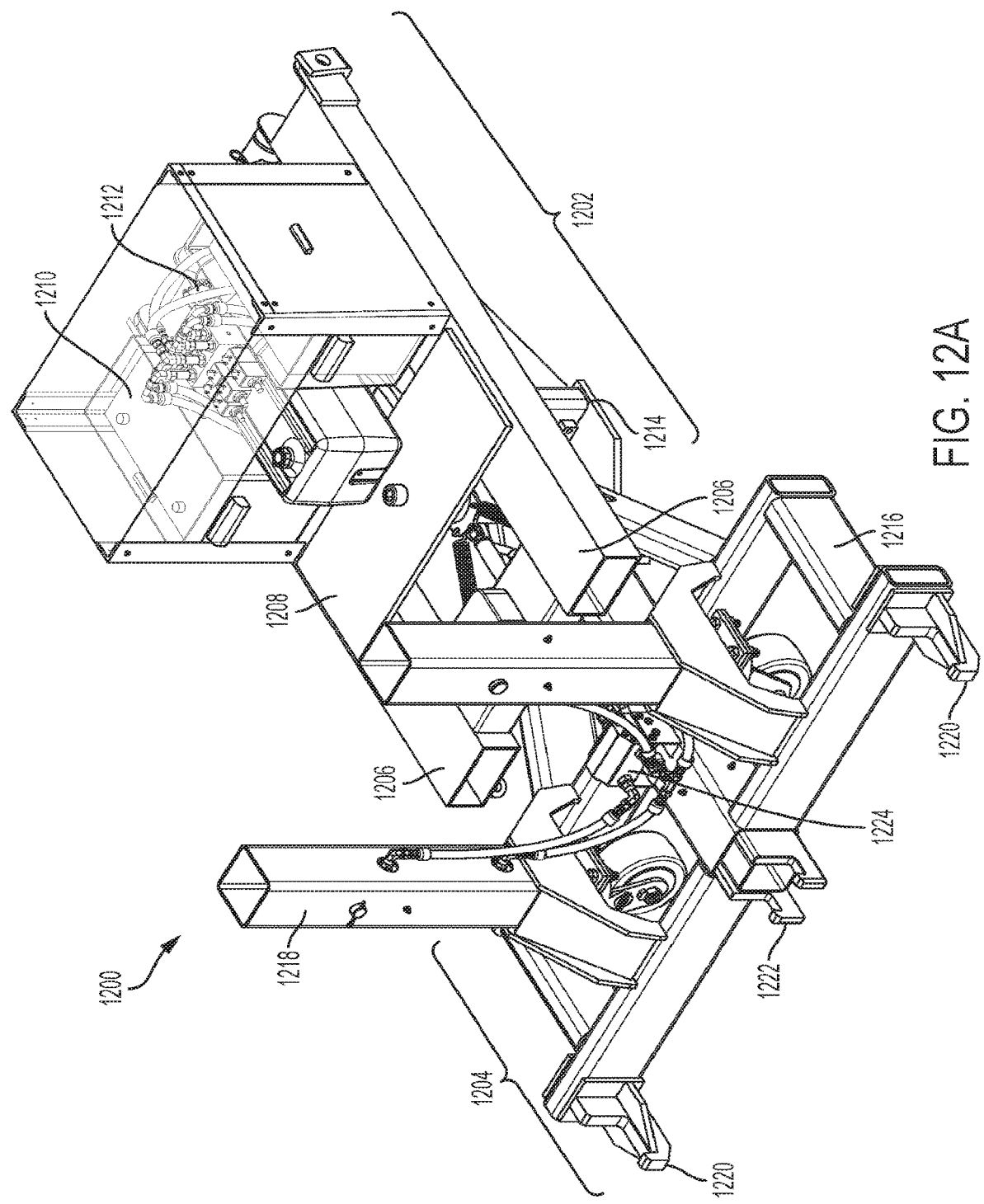
FIGS. 12A-12D depict various views of the actuating attachment used to deploy the mechanical actuation assembly of the MP.

FIG. 12A depicts a perspective view of actuating attachment 1200. Actuating attachment 1200 is formed from two sections: conveyance vehicle section 1202 and MP section 1204. Conveyance vehicle section 1202 is used to connect actuating attachment 1200 to a conveyance vehicle, such as a forklift, using forklift slots 1206 which are shaped to accommodate and retain the tines of a standard forklift. Conveyance vehicle section 1202 further comprises platform 1208 having power supply 1210 and hydraulic power unit 1212 placed thereon. The power for hydraulic power unit 1212 can be supplied from either power supply 1210 or directly from the conveyance vehicle (e.g., through a connector).

Conveyance vehicle section 1202 further comprises vertical pivot joint 1214 which allows conveyance vehicle section 1202 to pivot with respect MP section 1204. Vertical pivot joint 1214 allows MP 100 to easily be conveyed by a conveyance vehicle, especially during turns. Additional details of vertical pivot joint 1214 will be described later.

MP section 1204 comprises MP frame 1216 which connects MP section 1204 to conveyance vehicle section 1202; two hydraulic caster assemblies 1218; static hooks 1220; and hydraulically actuated hook 1222. Hydraulics junction box 1224 is connected to hydraulics power unit 1212 on conveyance vehicle section 1202 (e.g., through tubing) and provides the hydraulics used to operate hydraulic caster assemblies 1218 and hydraulically actuated hook 1222.

Static hooks 1220 are sized and spaced to mate with attachment connectors 210 depicted in FIG. 2B. Specifically, attachment connectors 210 have a lip along their upper surface which engages with static hooks 1220. Similarly, hydraulically actuated hook 1222 is sized to mate with T-bar 112 and is used to exert the required force on mechanical actuation assembly 106 as will be described later.

Figure 12B:
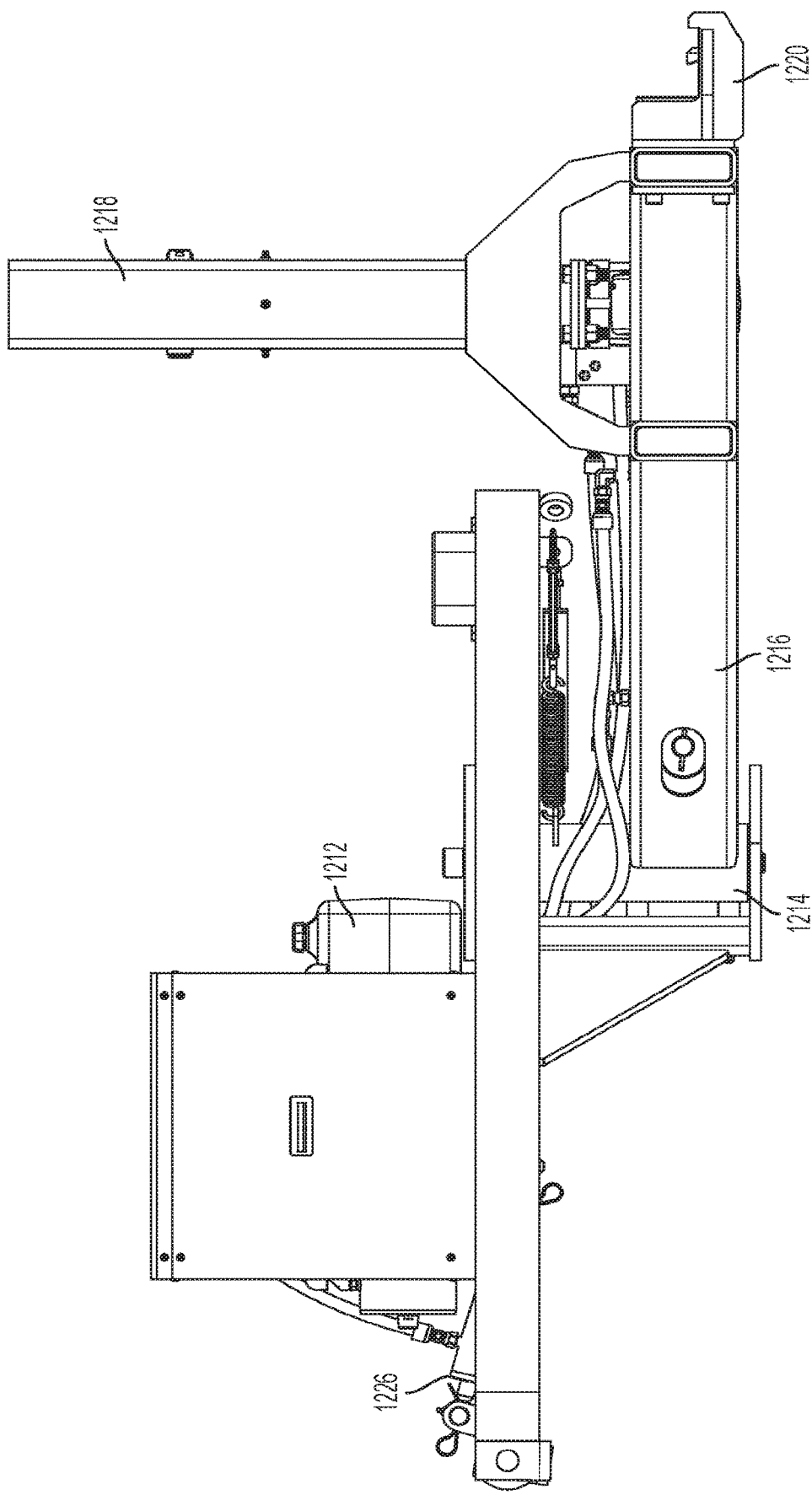
Figure 12C:
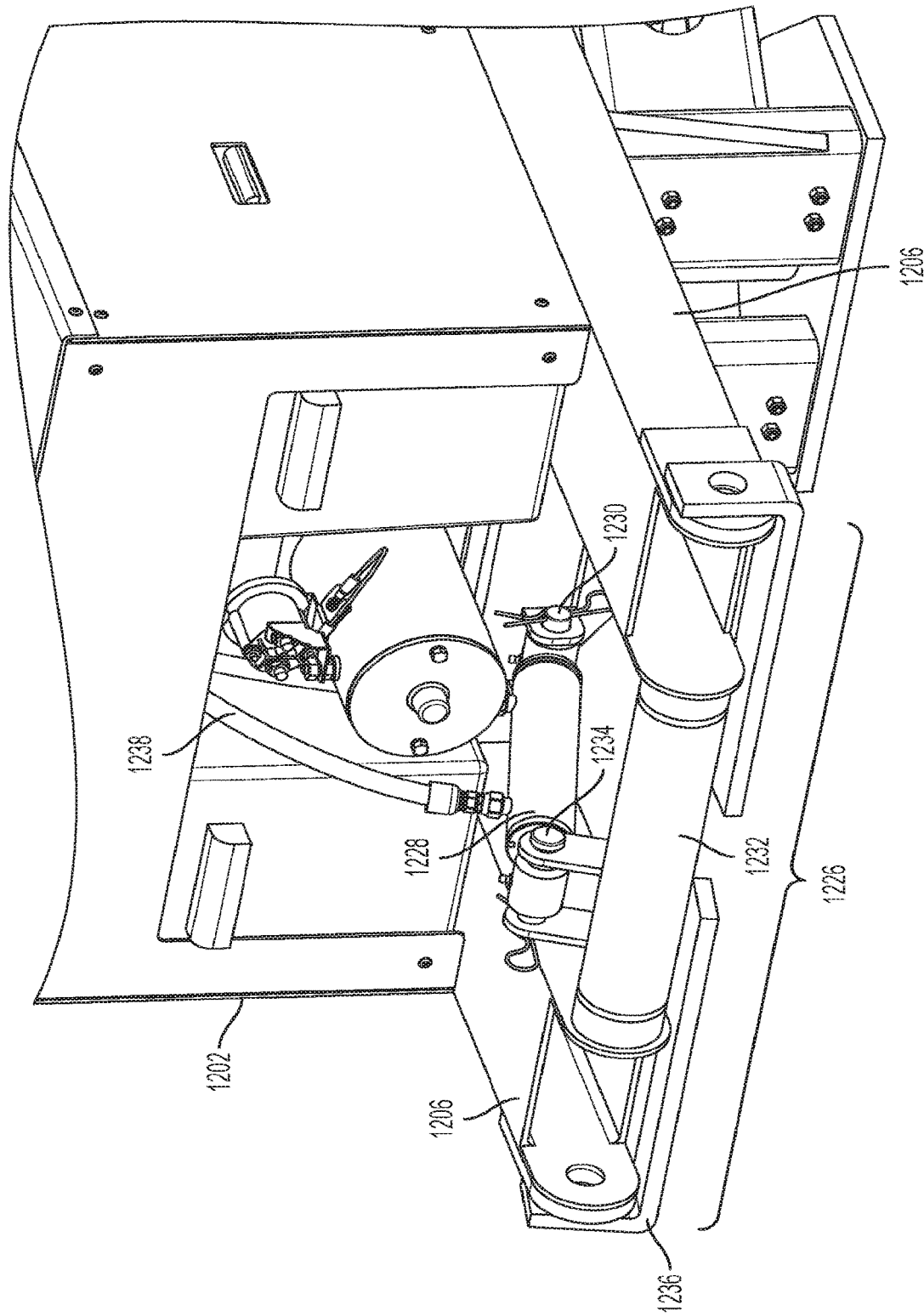
Figure 12D:
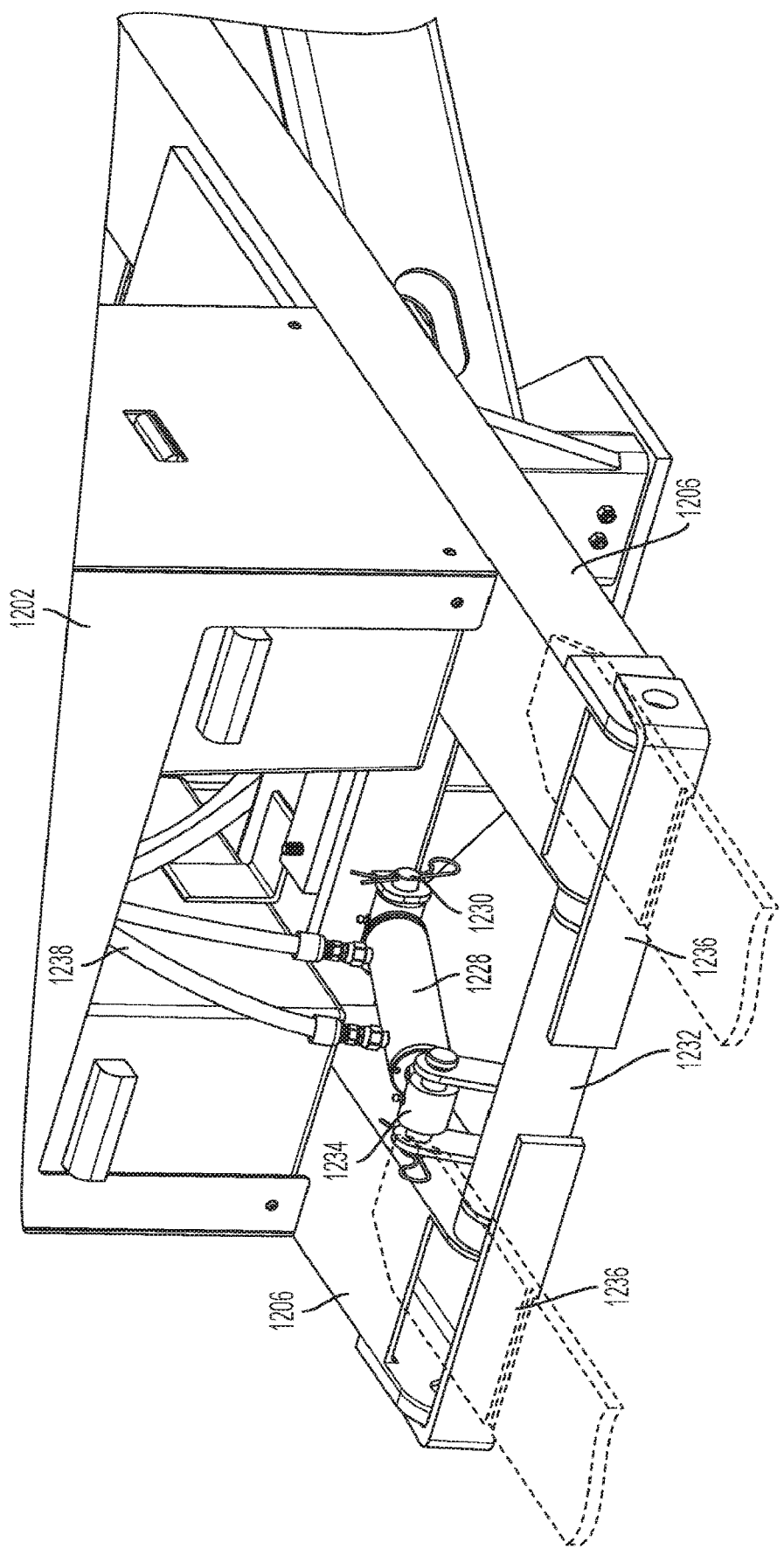

FIG. 12B depicts a side view of actuating attachment 1200 and FIG. 12C depicts a rear perspective view of actuating attachment 1200. Specifically, FIG. 12B provides a better view of vertical pivot joint 1214 and a partial view of conveyance vehicle locking mechanism 1226. As depicted in FIG. 12C, conveyance vehicle locking mechanism 1226 comprises hydraulic cylinder 1228 which is connected to conveyance vehicle section 1202 at a first end by pivot joint 1230. A second end of hydraulic cylinder 1228 is connected to cylinder 1232 by pivot joint 1234. The ends of cylinder 1232 are connected to forklift slots 1206. Further cylinder 1232 is also connected to locking bars 1236. As hydraulics supplied from hydraulic power unit 1212 through tubing 1238 cause hydraulic cylinder 1228 to contract as shown in FIG. 12D, cylinder 1232 and locking bars 1236 are rotated upward. Specifically, the locking bars 1236 mate with cutouts in the tines of the forklift placed into forklift slots 1206, preventing the conveyance vehicle from disengaging from conveyance vehicle section 1202.

Figure 13A:
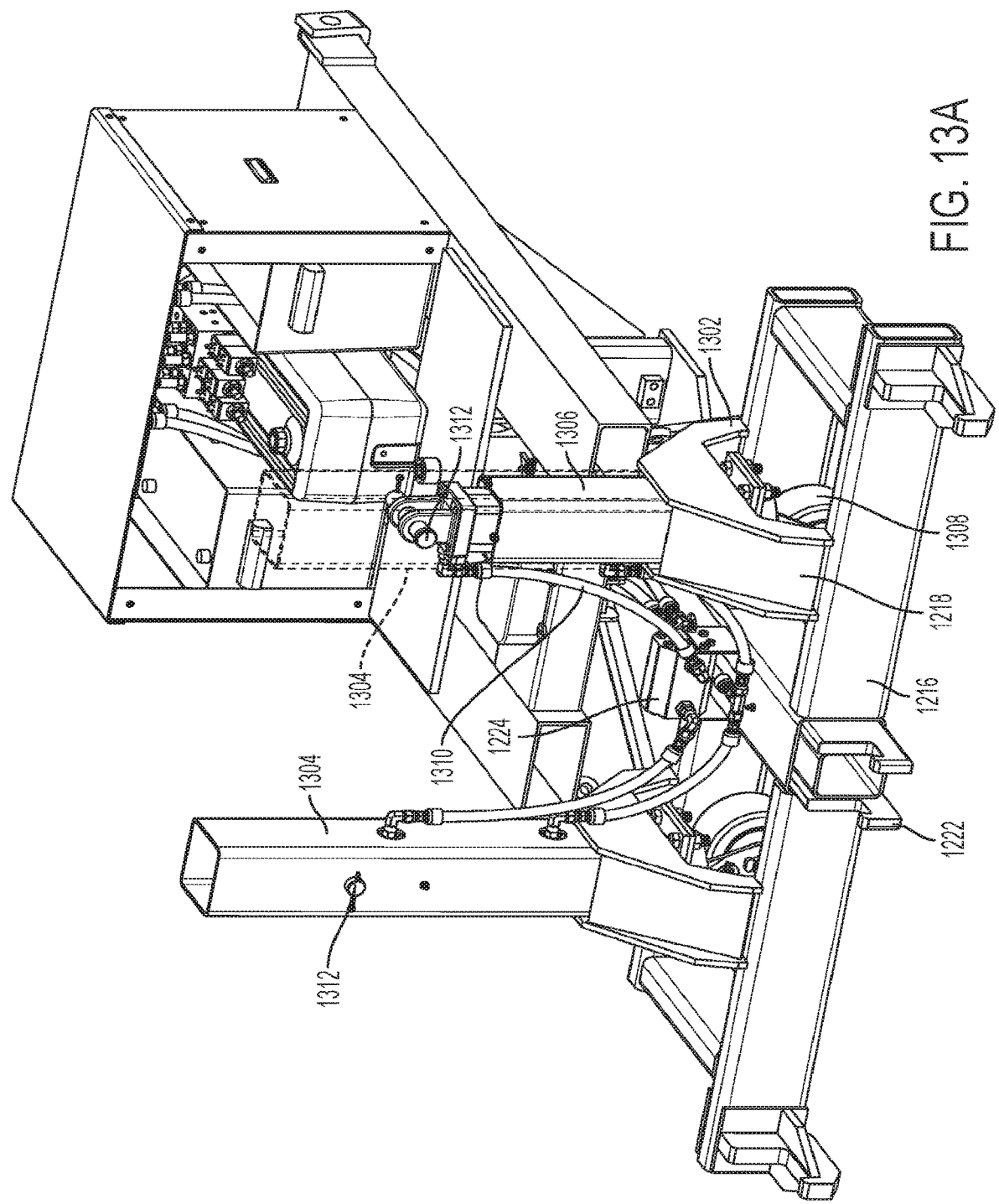
FIGS. 13A-13B depict a hydraulic caster assembly in undeployed and deployed positions, respectively.

FIG. 13A depicts a hydraulic caster assembly 1218 in its retracted position. Hydraulic caster assembly 1218 comprises frame connector 1302, vertical shaft 1304 (shown in phantom), hydraulically actuated sleeve 1306, caster 1308, and tubing 1310. Frame connector 1302 connects hydraulic caster assembly 1218 to MP frame 1216 and allows caster 1308 to be deployed and retracted. Hydraulically actuated sleeve 1306 is connected to vertical shaft 1304 in a sliding connection. A first end of hydraulically actuated sleeve 1306 is fixed within vertical shaft 1304 by fixing pin 1312. Tubing 1310 provides hydraulics from hydraulics junction box 1224 to deploy/retract hydraulically actuated sleeve 1306 and caster 1308.

Figure 13B:
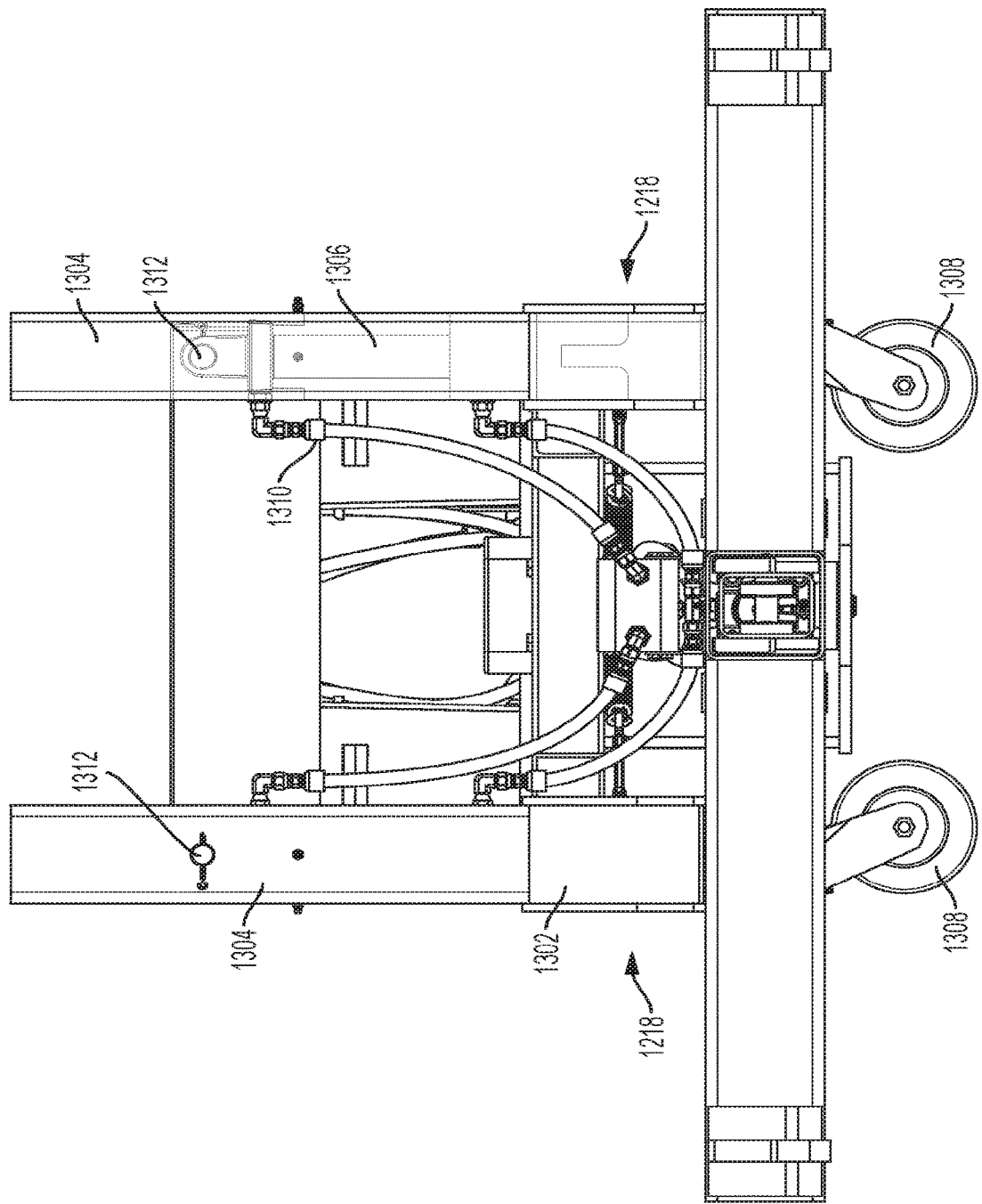

FIG. 13B depicts a front view of actuating attachment 1200 having both hydraulic caster assemblies 1218 fully deployed. As shown, the expansion of hydraulically actuated sleeve 1306 causes caster 1308 to be deployed below a bottom surface of MP frame 1216. The upward movement of MP frame 1216 causes static hooks 1220 to actively engage attachment connectors 210 on MP 100. Further, this also causes hydraulically actuated hook 1222 to actively engage/lock T-bar 112. Hydraulically actuated hook 1222 can then be contracted to cause the actuation of mechanical actuation assembly 106 as has already been described.

Figure 14A:
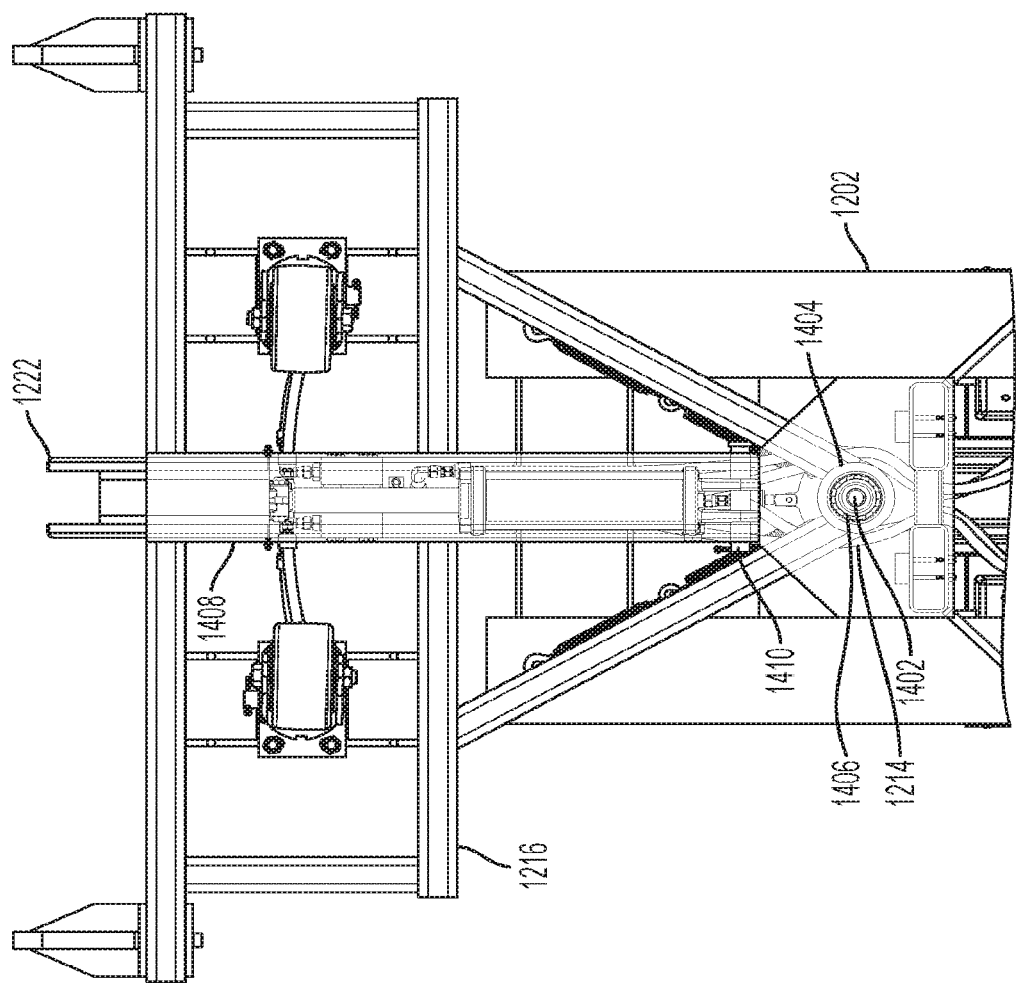
FIGS. 14A-14B depict the hydraulically actuated hook in undeployed and deployed positions, respectively.

Referring now to FIG. 14A, depicted is a bottom view of actuating attachment 1200 to show vertical pivot joint 1214, MP frame 1216, and hydraulically actuated hook 1222 in more detail. Vertical pivot joint 1214 consists of inner cylinder 1402 fixed to conveyance vehicle section 1202 and an outer cylinder 1404 forming a part of MP frame 1216. A ball bearing assembly 1406 located between inner cylinder 1402 and outer cylinder 1404 allows MP frame 1216 to freely rotate about inner cylinder 1402. It should be apparent to one of ordinary skill in the art that other types of joints (e.g., ball and socket), may also be utilized.

MP frame 1216 further comprises central shaft 1408 (shown in phantom) in which hydraulically actuated hook 1222 is located. A fixing pin 1410 is passed through central shaft 1408 and a first end of hydraulically actuated hook 1222 preventing movement of the first end of hydraulically actuated hook 1222 with respect to central shaft 1408.

Figure 14B:
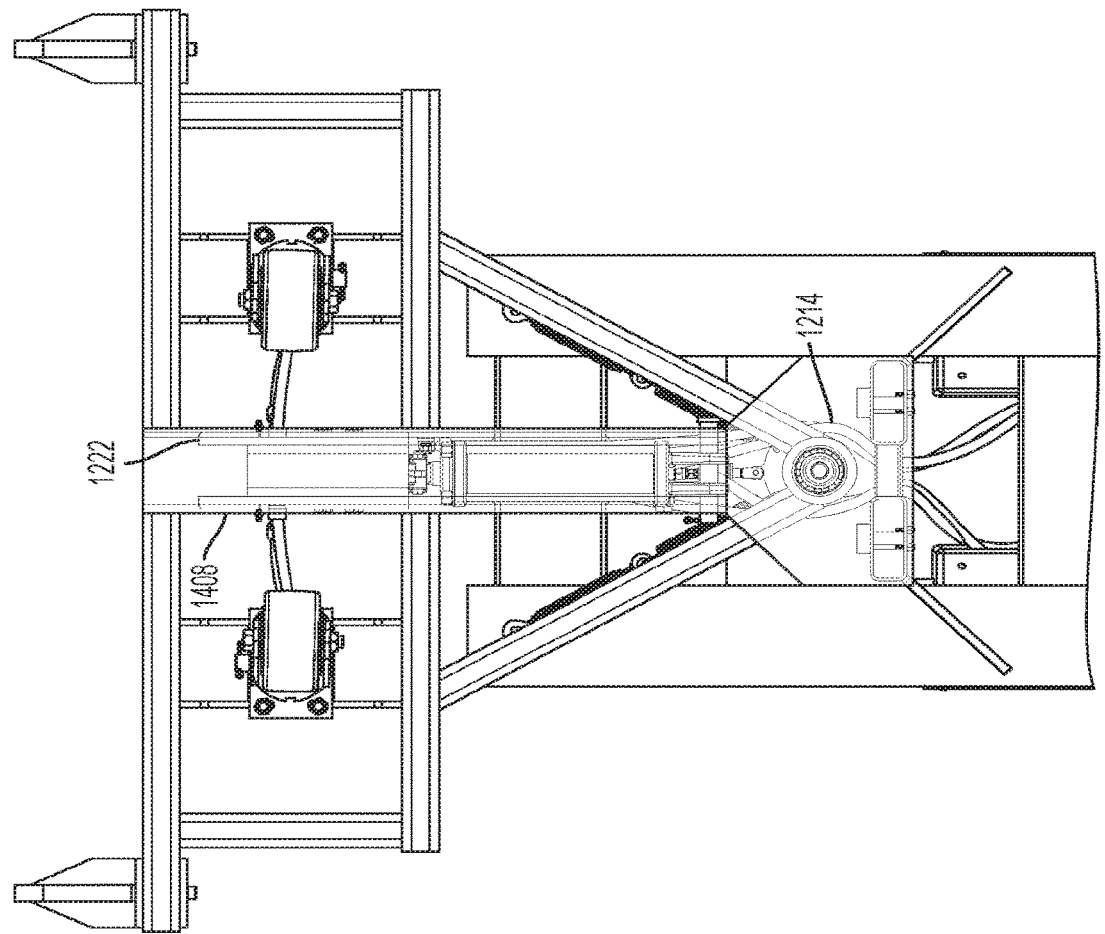

Hydraulically actuated hook 1222 is shown fully contracted in FIG. 14B. As shown, the hook is retracted into central shaft 1408. When hydraulically actuated hook 1222 is connected to T-bar 112 and hydraulically actuated hook 1222 is retracted (as shown in FIGS. 14A-14B), this causes mechanical actuation assembly 106, and subsequently roller assemblies 108, to become deployed.

The deployment of casters 1308 provides a number of functions. First, the deployment of casters 1308 causes a front portion of MP 100 to be lifted off the ground. For this reason, only two sets of roller assemblies 108 are needed in MP 100, leading to a weight reduction. However, as already explained, the MP 100 can easily be modified to include any number of roller assemblies 108.

Casters 1308 are also connected on swivel joints (e.g., the casters have 360° freedom of rotation). This allows the front of MP 100 to easily be steered in a warehouse by a conveyance vehicle, especially when loaded with freight.

Additional Actuating Attachments

Figure 15A:
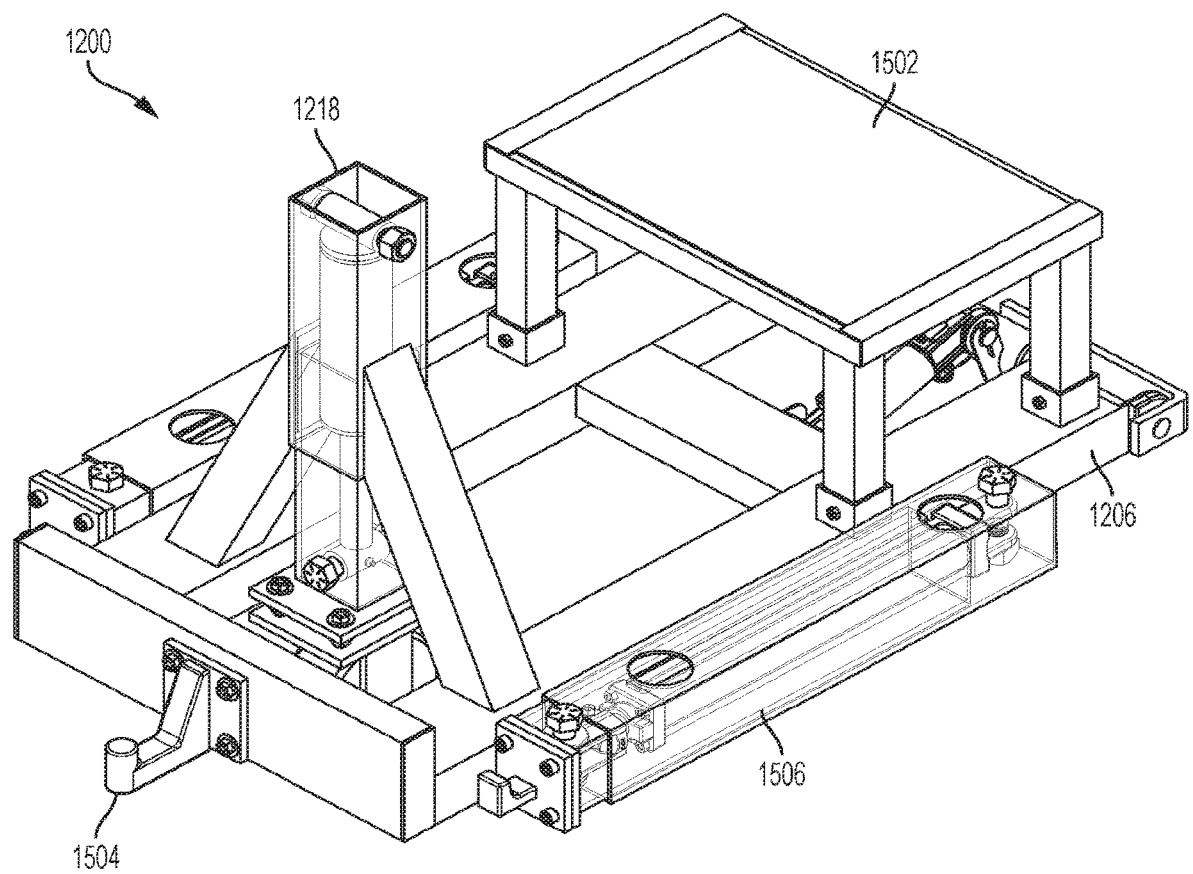

Different embodiments for actuating attachment 1200 will now be described. For brevity, only the notable differences between the currently described embodiments and the actuating attachment of FIGS. 12A-14B will be described. First, with reference to FIGS. 15A and 15B, shown in an embodiment of actuating attachment 1200 in which there is no separation between conveyance vehicle section 1202 and MP section 1204 (e.g., there is no vertical pivot joint 1214). In this embodiment of actuating attachment 1200, a single hydraulic caster assembly 1218 is mounted between forklift slots 1206. A rear of actuating attachment 1200 also contains conveyance vehicle locking mechanism 1226. Shelf 1502, mounted to forklift slots 1206, is used to house power supply 1210 and/or hydraulic power unit 1212. A single fixed hook 1504 is provided in the front center of actuating attachment 1200 and two hydraulically actuated hooks 1506 are mounted to the sides of each forklift slots 1206.

In order to use the actuating attachment with MP 100, forklift tines would first be inserted into forklift slots 1206 and then conveyance vehicle locking mechanism 1226 would be activated to lock the forklift tines. Next, the forklift would lift the actuating attachment 1200 and convey it to MP 100. It should be noted that this actuating attachment 1200 is better suited for when T-bar 112 is replaced by lunette eye 402 or other similar attachment.

Fixed hook 1504 is placed under the lunette eye 402 of MP 100 and hydraulically actuated caster assembly deploys caster 1308 so securely fasten actuating attachment 1200 to MP 100. This also lifts the front end of MP 100 off the ground slightly. Next hydraulically actuated hooks 1506 are extended towards MP 100 and enter attachment connectors 210. The force suppled on MP 100 by hydraulically actuated hooks 1506 causes mechanical actuation assembly 106 to be deployed as has already been described.

Figure 16A:
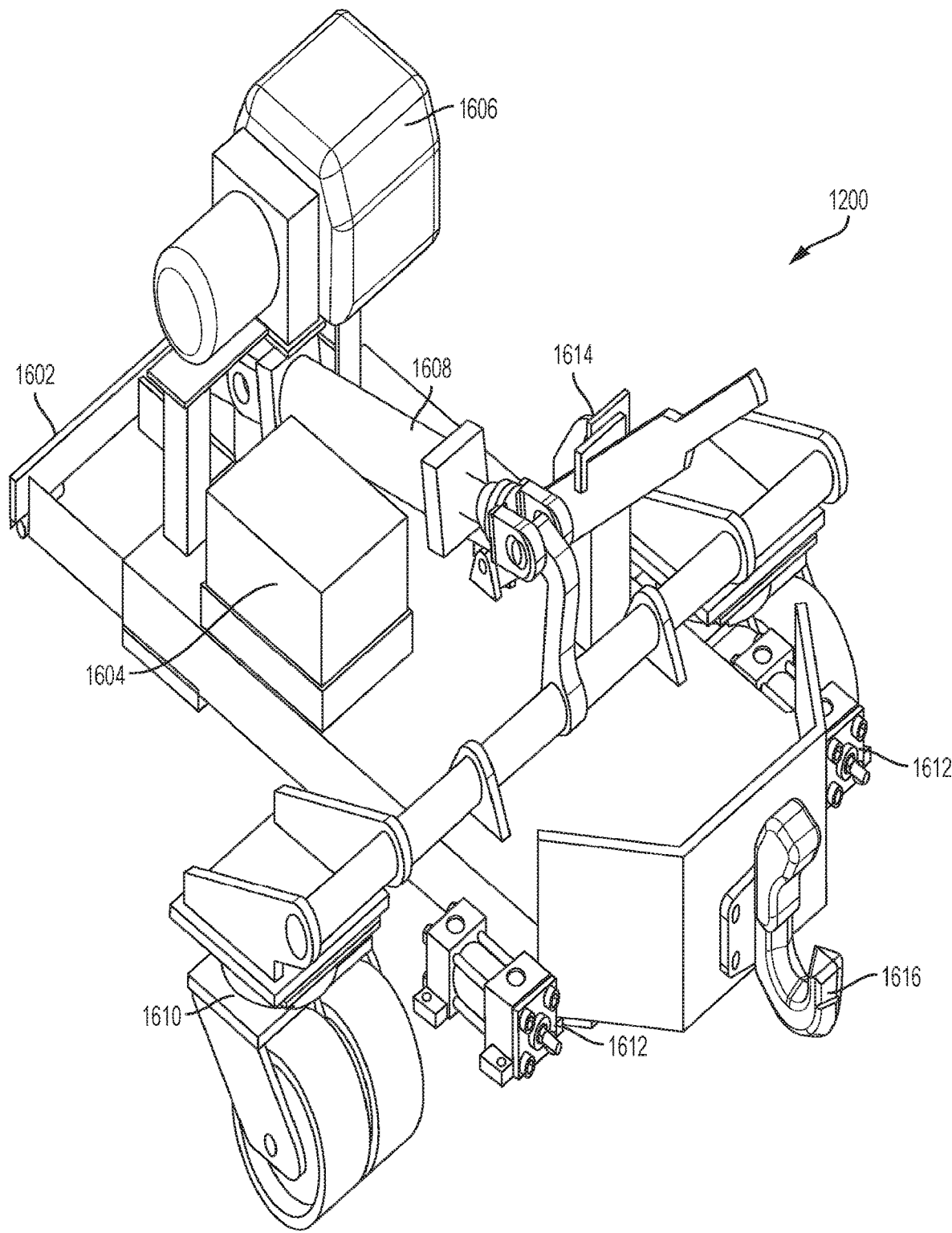
Figure 16B:
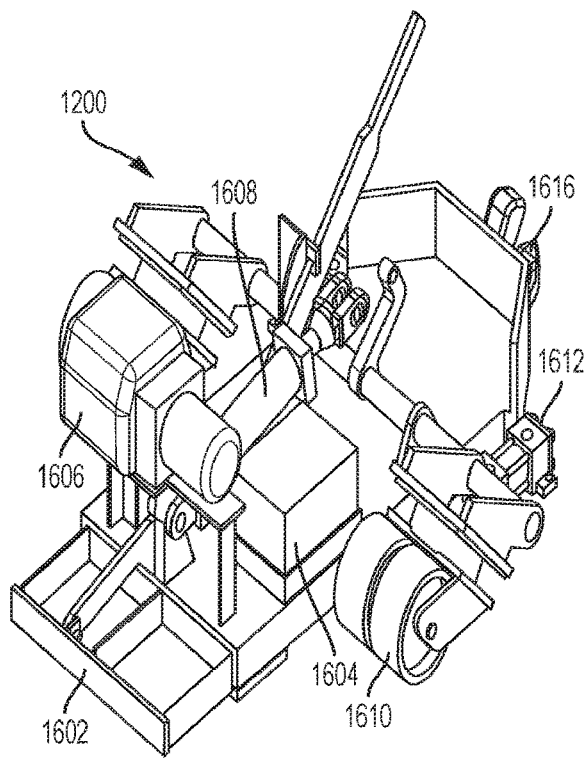
Figure 16C:
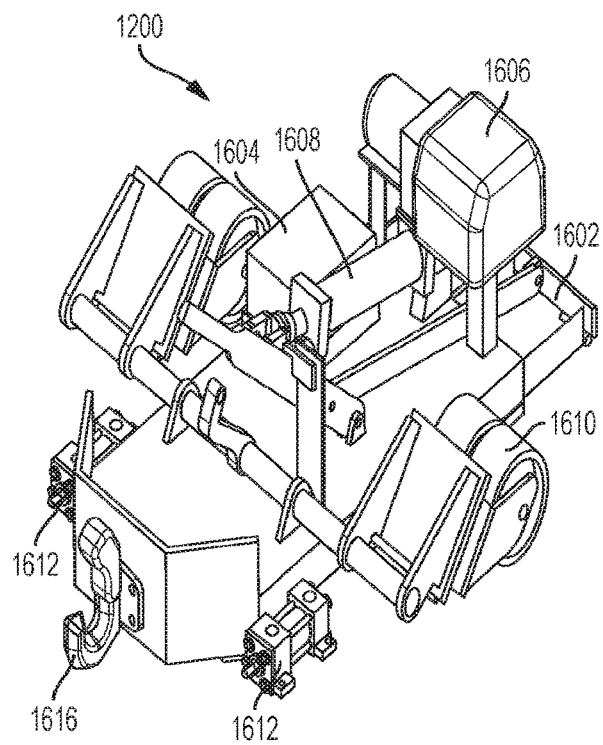
Figure 16D:
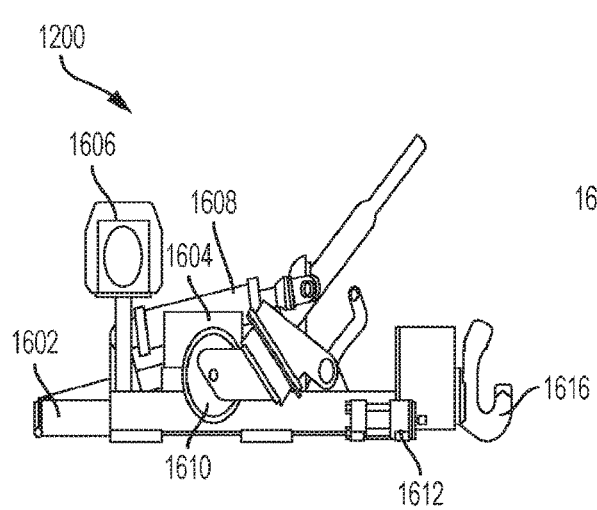
Figure 16E:
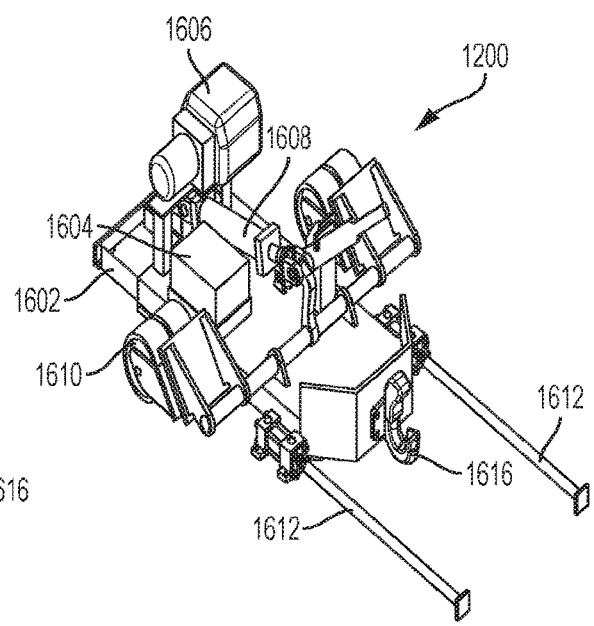

FIGS. 16A-16H depict another embodiment of actuating attachment 1200. As depicted, actuating attachment 1200 generally comprises forklift connection 1602, power supply 1604, hydraulic power unit 1606, caster hydraulic cylinder 1608, casters 1610, pushing hydraulic cylinders 1612, locking mechanism 1614, and hook 1616. Hydraulic power unit 1606, powered by power supply 1604, drives both caster hydraulic cylinder 1608 and pushing hydraulic cylinders 1612. Power supply 1604 can either be a battery or a power supply connection from an external source, such as the forklift. Pintle hook 1616 is first engaged with lunette eye 402 of MP 100 (as described with reference to FIGS. 15A-15B) by maneuvering actuating attachment 1200 until the two interlock. Then, to actuate mechanical actuation assembly 106, the pushing hydraulic cylinders 1612 are extended as depicted in FIGS. 16E and 16F. This causes a pulling force to be exerted on mechanical actuation assembly 106 and roller assemblies 108 become deployed. Next, caster hydraulic cylinder 1608 can be extended, causing casters 1610 to pivot downward as depicted in FIGS. 16A, 16G, and 16H. This causes the front end of MP 100 to become slightly raised off the ground and casters 1610 can be used to steer MP 100 more easily. At this point, a fully loaded MP 100 can easily be conveyed to/from a trailer or around a warehouse by a standard 4,000 pound and to allow for removing/inserting MP 100 out of an uneven (not level with dock) trailer.

For lighter loads on MP 100, only the casters 1610 need to be extended and the MP 100 can be moved around similar to a wheelbarrow using fixed rollers 110 on MP 100. Further, instead of pushing hydraulic cylinders 1612, other actuating means, such as a leadscrew or internal hydraulics, may be utilized.

Figure 17A:
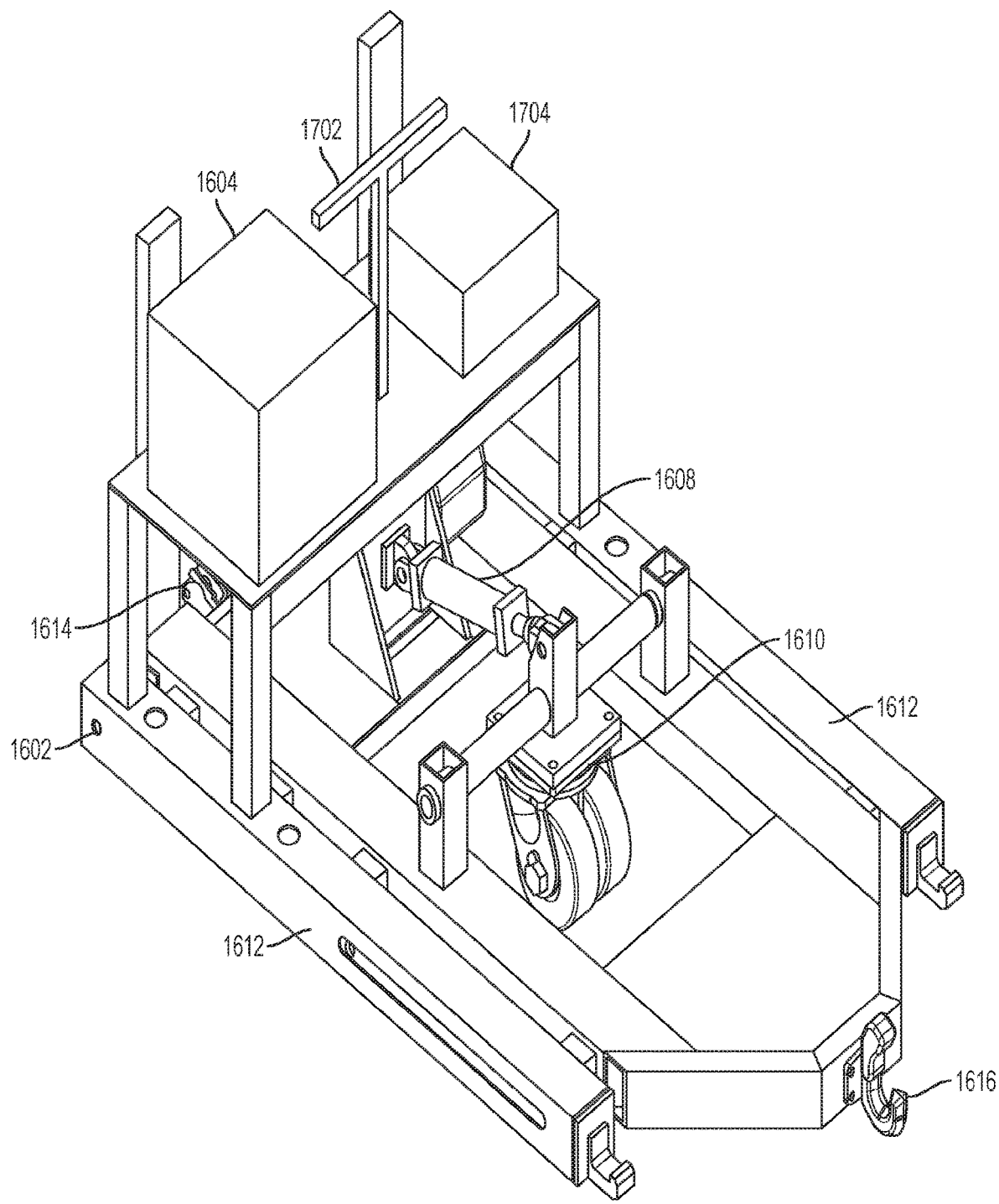
FIGS. 17A-17H depict a third alternate embodiment of an actuating attachment.
Figure 17B:
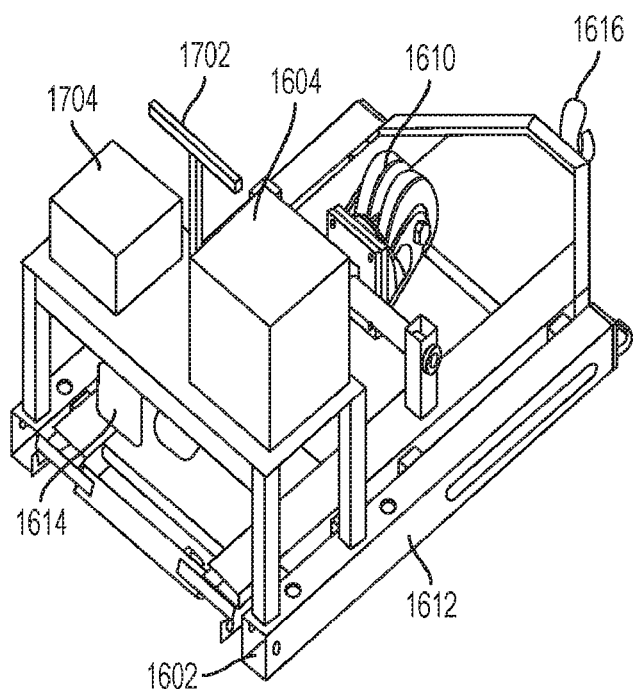
Figure 17C:
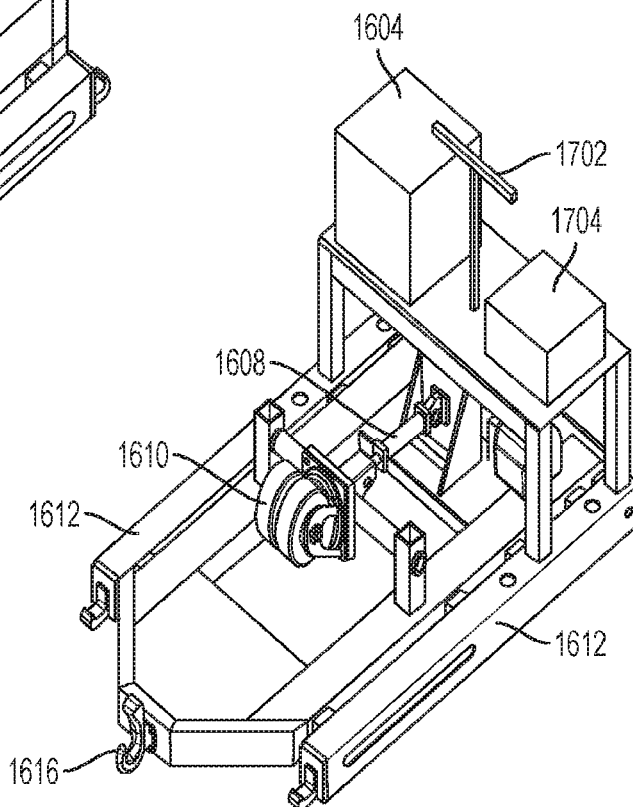
Figure 17D:
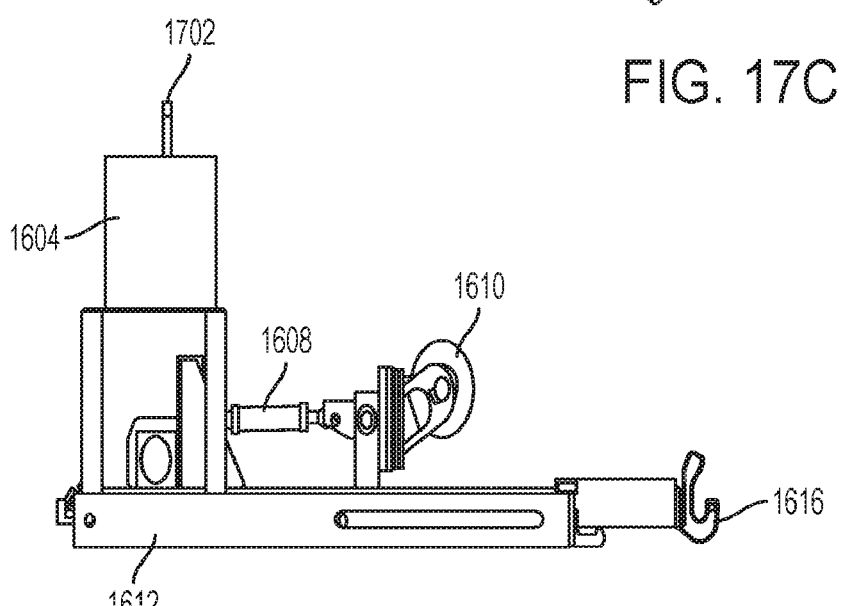

FIGS. 17A-17H depict an alternate embodiment of actuating attachment 1200. As depicted in FIG. 17A, actuating attachment 1200 generally comprises forklift connection 1602, power supply 1604, hydraulic power unit 1606, caster hydraulic cylinder 1608, swivel caster 1610, pushing hydraulic cylinders 1612, locking mechanism 1614, pintle hook 1616, guide lights 1702, and control box 1704. Hydraulic power unit 1606, powered by power supply 1604, drives both caster hydraulic cylinder 1608 and pushing hydraulic cylinders 1612. In this embodiment, pushing hydraulic cylinders 1612 are contained within the frame of actuating attachment 1200.

Figure 17E:
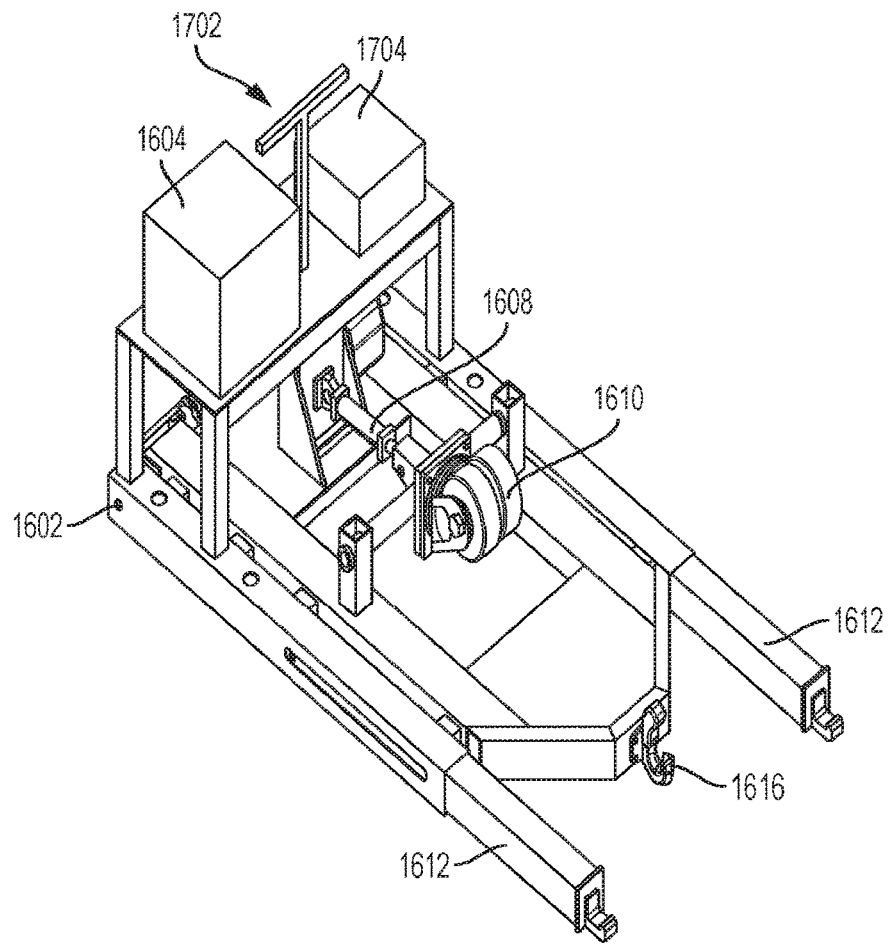
Figure 17F:
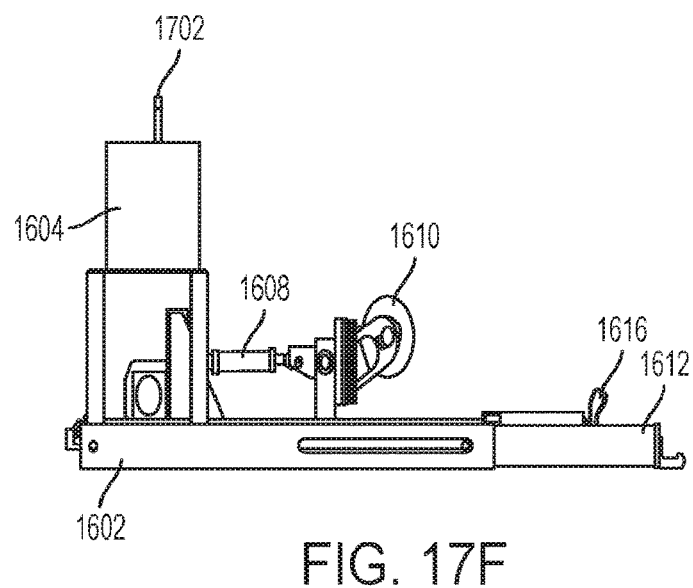
Figure 17G:
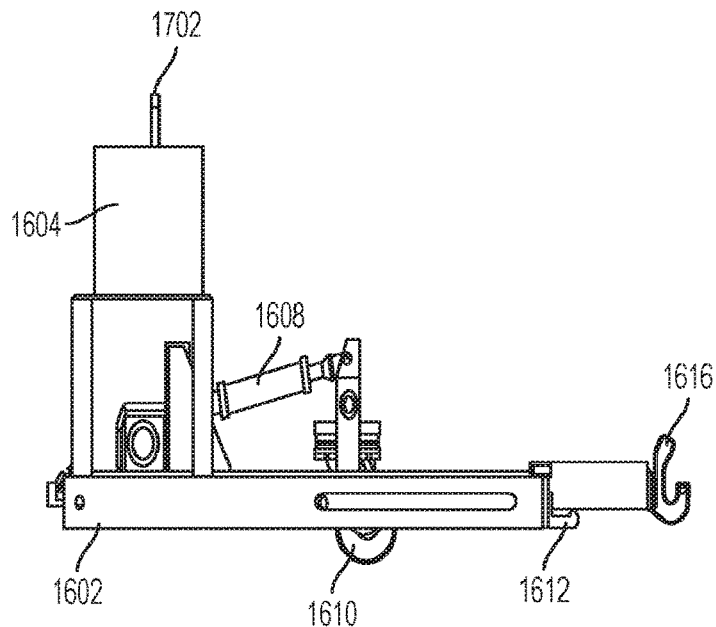
Figure 17H:
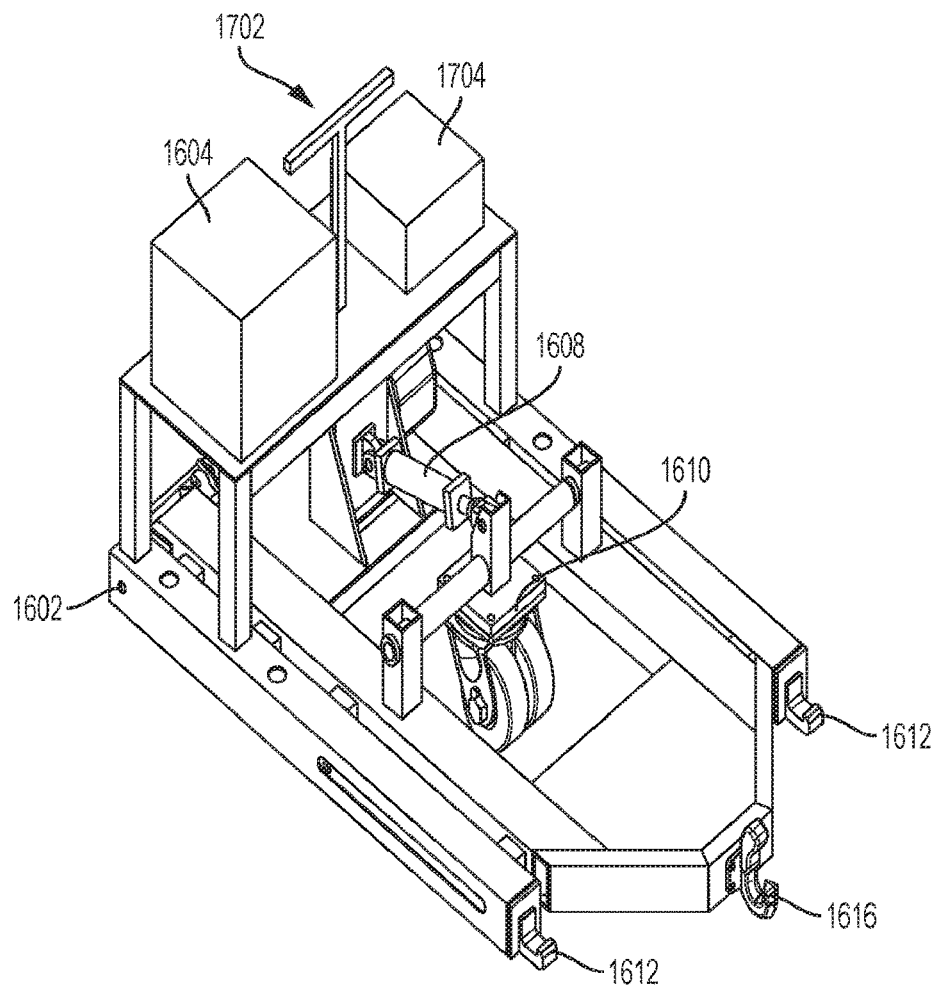

Power supply 1604 can either be a battery or a power supply connection from an external source, such as the forklift. Pintle hook 1616 is first engaged with lunette eye on MP 100 by maneuvering forklift attachment 1200 until the two interlock. Then, to actuate mechanical actuation assembly 106, the pushing hydraulic cylinders 1612 are extended as depicted in FIGS. 17E and 17F. This causes a pulling force to be exerted on the lunette eye 402 which actuates mechanical actuation assembly 106. Next, caster hydraulic cylinder 1608 can be extended, causing swivel caster 1610 to pivot downward as depicted in FIGS. 17A, 17G, and 17H. This causes the front end of MP 100 to become slightly raised and swivel caster 1610 can be used to turn MP 100 more easily. In this embodiment, swivel caster 1610 provides an increased turning radius because the single swivel caster 1610 can rotate in any direction.

Figure 18A:
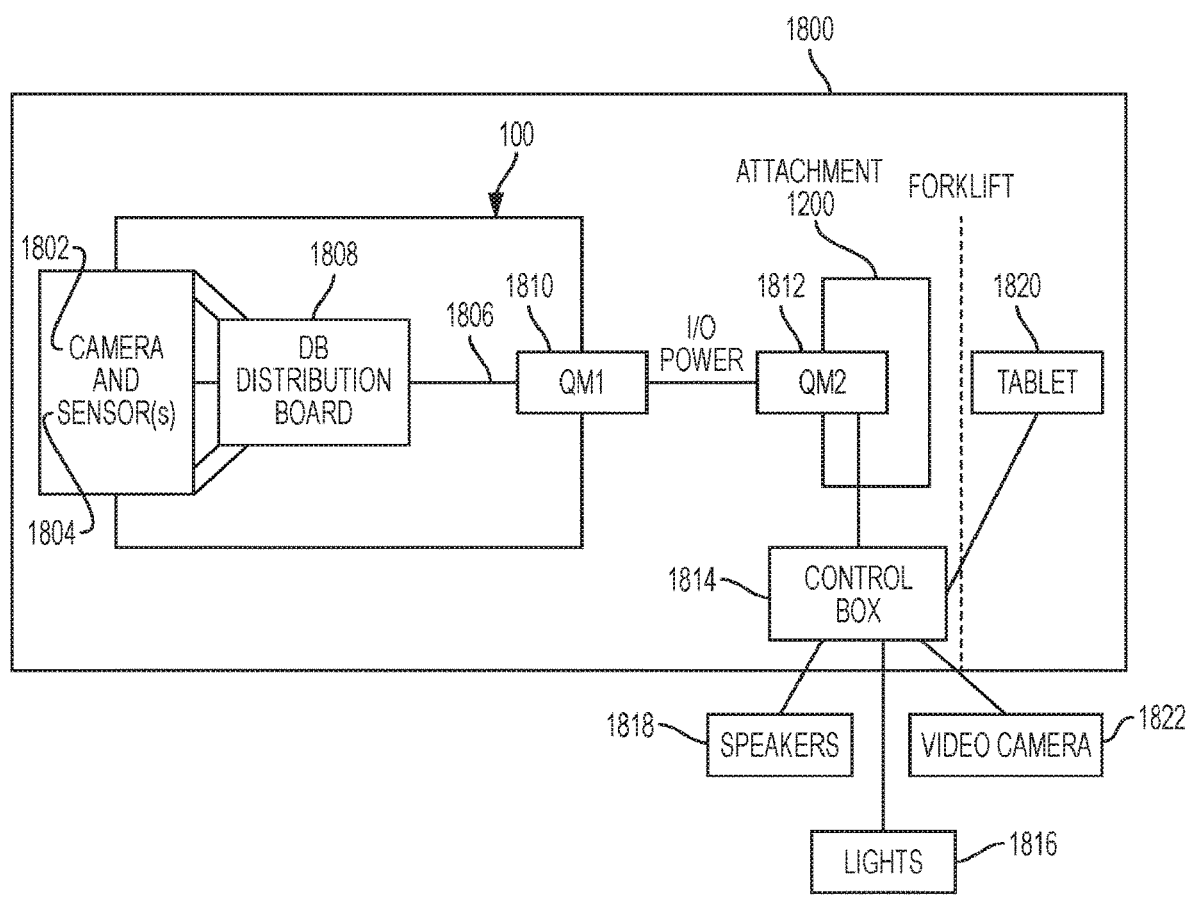
FIG. 18A depicts a schematic for a first embodiment of a MP collision avoidance sensing system.

Referring next to FIG. 18A, depicted is a first embodiment of MP Collision Avoidance (MPCA) sensing system 1800. The MPCA sensing system 1800 comprises camera 1802 and proximity sensors 1804 located on a rear portion of MP 100 (e.g., near fixed rollers 110). Proximity sensors 1804 may be any type of sensor capable of detecting collisions such as inductive, capacitive, photoelectric and ultrasonic. The purpose of the MPCA sensing system 1800 is to collect data such as, but not limited to, video, proximity of nearby objects and relay that information to the opposite end of the MP 100 (e.g., to the forklift driver).

FIG. 18A also depicts the wiring conduit 1806 for MPCA sensing system 1800. MP 100 may be wired using any known methods. A distribution board 1808 supplies power to camera 1802 and proximity sensors 1804. A female quick mate (QM) connector 1810 is mounted to MP 100 and a male QM connector 1812 is mounted to actuating attachment 1200. The male QM connector 1812 and female QM connector 1810 are connected when MP 100 is being conveyed by actuating attachment 1200.

QM connectors 1810 and 1812 allow for a quick data and power connection between actuating attachment 1200 and MP 100. QM connectors 1810 and 1812 may be used to transfer data, video, and power from MP 100 via distribution board 1808 and wiring conduit 1806 to the control box 1814 on actuating attachment 1200.

Visual and auditory cues are outputted via high power LEDs (lights 1816) and speaker(s) 1818 on actuating attachment 1200. A direct correlation between the proximity of objects is made to the sound and visuals of the lights outputted by lights 1816 and/or speakers 1818. This helps the forklift driver know approximately how far away he is from an object.

Control box 1814 works as the brain of the MPCA sensing system 1800. The control box 1814 interprets input signals such as sensor data, voltage, camera, etc. Following the inputs, the control box 1814 analyzes these inputs by using stored algorithms and makes decisions as to what the proper outputs for the speakers 1818 and lights 1816 should be.

For example, if it is determined by MPCA sensing system 1800 that an object is becoming closer to MP 100, MPCA sensing system 1800 may cause speakers 1818 to emit a sound that increases as the object becomes closer. Further, in some embodiments, the lights 1816 may change color to indicate that an object is too close to MP 100 during transport. Essentially, MPCA sensing system uses takes the camera (video camera 1802) and sensor data (proximity sensors 1804) from the end of the MP and displays different colors based on the proximity to an object. Furthermore, the control box 1814 transfers video and sensor data to a tablet 1820 mounted on a forklift via a wireless and/or USB connection.

In some embodiments, the MPCA sensing system 1800 may also comprise a video camera 1822 attached to a front portion of actuating attachment 1822. The video feed from video camera 1822 can be supplied to tablet 1820 to aid the forklift driver and aligning male QM connector 1812 with female QM connector 1812.

Figure 18B:
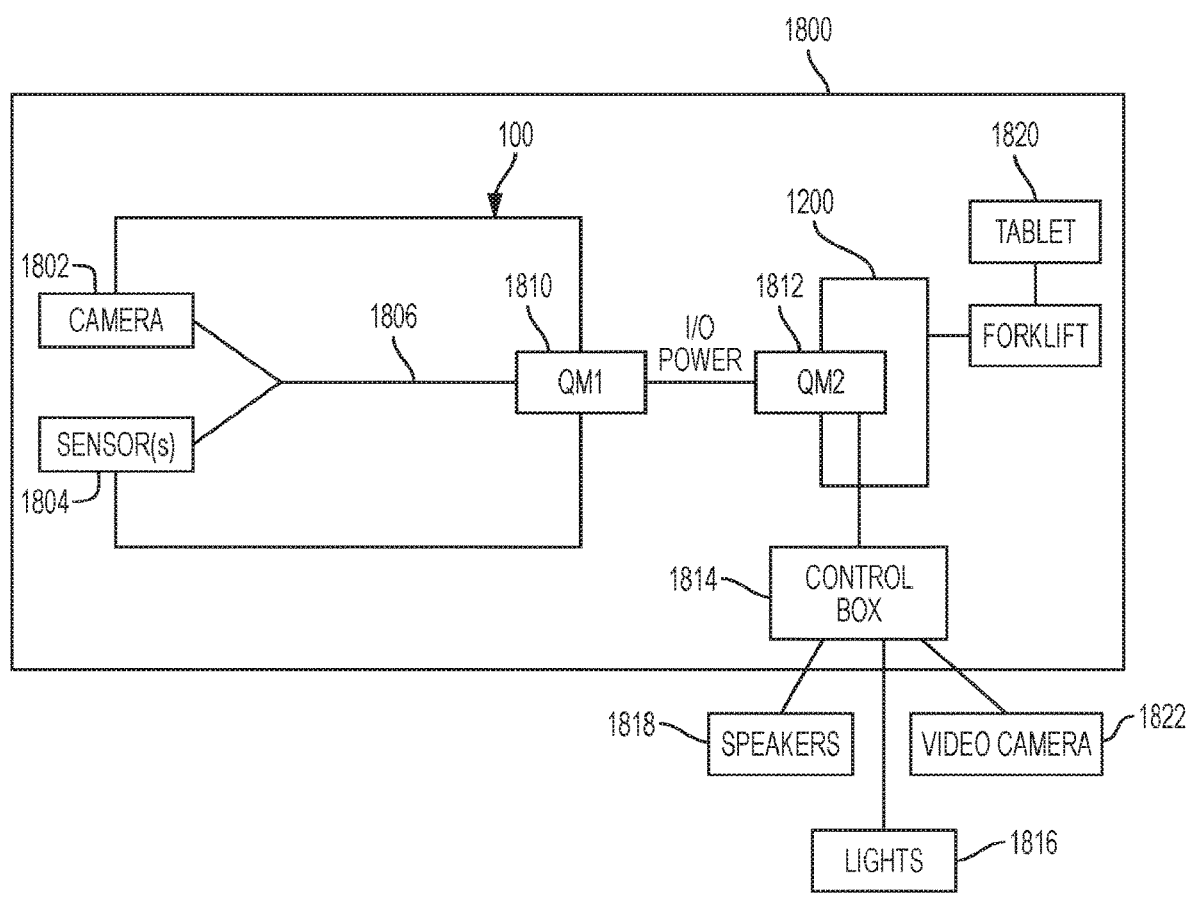
FIG. 18B depicts a schematic for a second embodiment of a MP collision avoidance sensing system.

The embodiment of MPCA sensing system 1800 shown in FIG. 18B is substantially similar in function to that described with respect to FIG. 18A with certain differences. First, in this embodiment, a direct electrical and data connection is provided between video camera 1802, proximity sensors 1804, and female QM connector 1810 without the need for distribution board 1808. Further, in this embodiment, tablet 1820 handles the functions of the control box 1814 depicted in FIG. 18A. Thus, in this embodiment, tablet 1820, located on the forklift, receives data from video camera 1802, proximity sensors 1804 (wired or wirelessly) and generates the appropriate outputs. Further, tablet 1820 controls the outputs of lights 1816 and speakers 1818. And, like in FIG. 18A, tablet 1820 also receives the video feed from video camera 1822 provided on actuating attachment 1822.

Figure 19A:
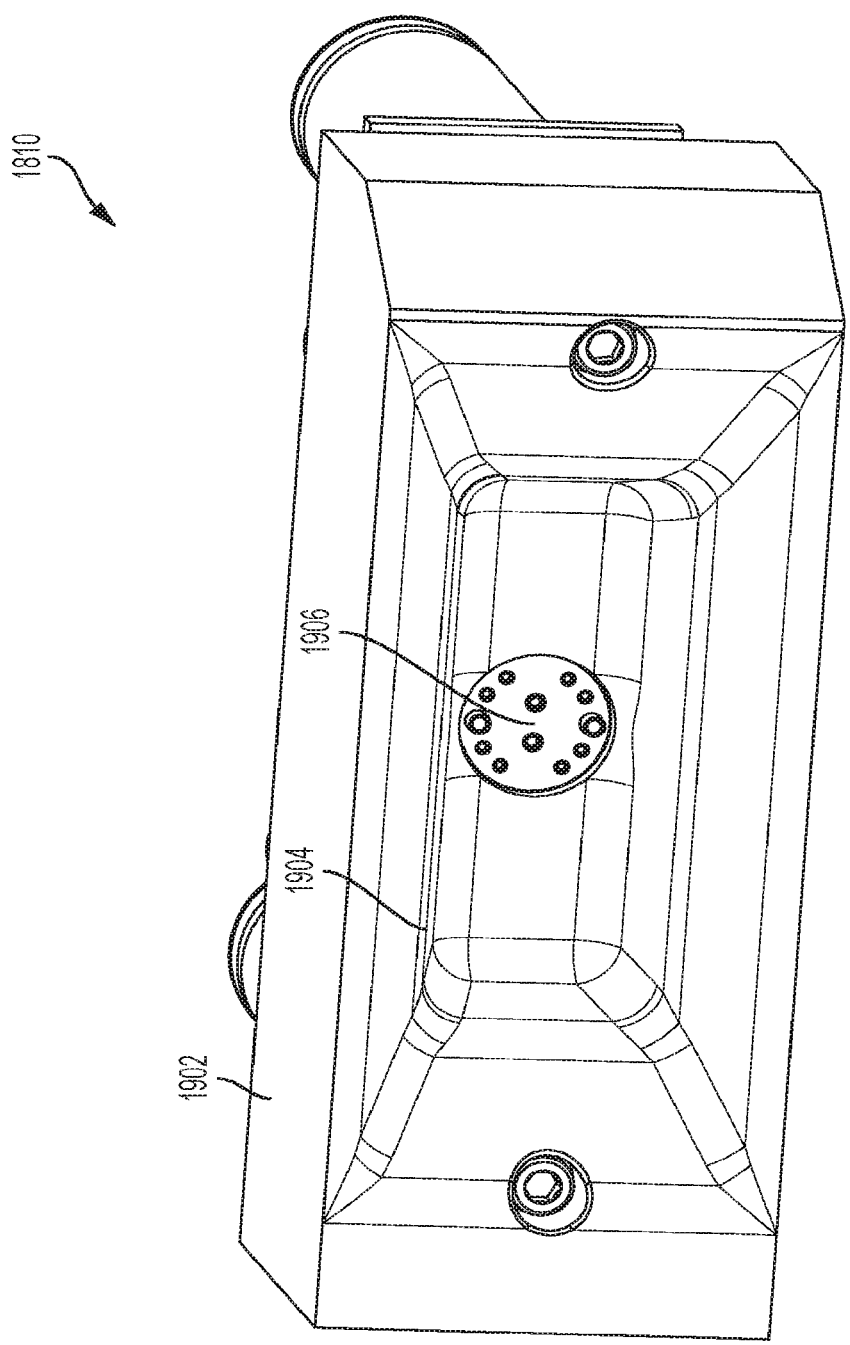

FIGS. 19A-19B depict front and rear views of an embodiment of female QM connector 1810. As depicted in FIG. 19A, female QM connector 1810 has a rectangular housing 1902. An angled recess 1904 on a front face of rectangular housing 1902 has a data connector 1906 at its center. Angled recess 1904 has four inward-facing angled walls to male QM connector 1812 to the center of angled recess 1904 as it is inserted.

Figure 20:
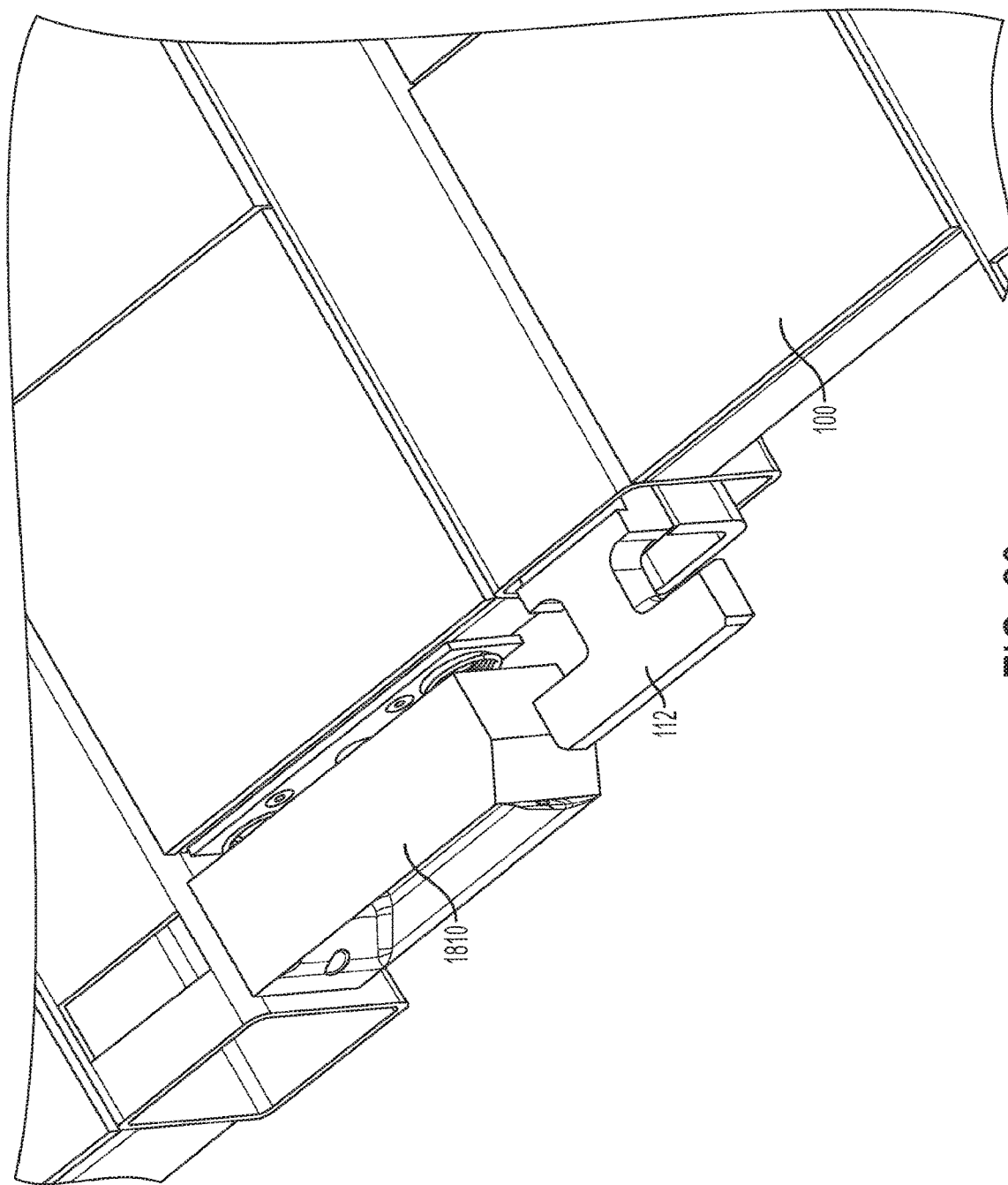
FIG. 20 depicts a view of the female QM connector attached to an MP.

FIG. 19B depicts a rear view of female QM connector 1810 with rectangular housing 1902 shown in phantom. Data connector 1906 is mounted to face plate 1908 and protrudes through circular opening 1910 into angled recess 1904. A front of a first set of inner cylindrical tubes 1912 are bolted within rectangular housing 1902. Each inner cylindrical tube 1912 is slidably connected within two outer cylindrical tubes 1914. A rear cap 1916 connected to each inner cylindrical tube 1912 prevents inner cylindrical tubes 1912 from becoming disengaged from outer cylindrical tubes 1914. Two springs 1918 surrounding inner cylindrical tubes bias rectangular housing 1902 away from face plate 1908 and allow for a connection to be maintained between female QM connector 1810 and male QM connector 1812 over a wider distance (e.g., because springs 1918 can compress). A plurality of bolts 1920 are used to secure female QM connector 1810 to MP 100. Preferably, female QM connector 1810 is mounted to MP 100 as depicted in FIG. 20. Specifically, female QM connector 1810 is preferably mounted to the immediate left or right of T-bar 112.

Figure 21A:
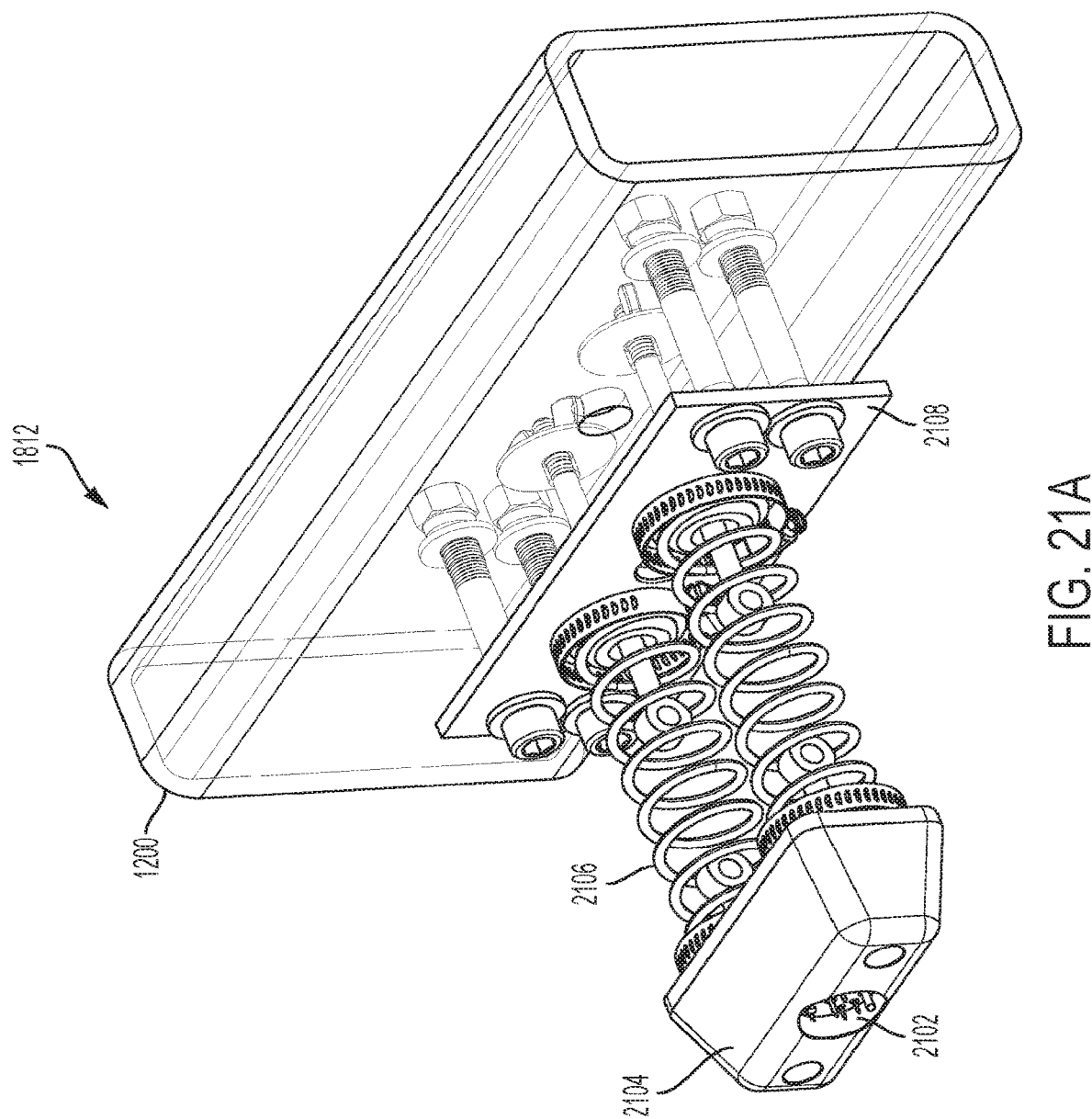
FIGS. 21A-21B depict views of a male QM connector.
Figure 21B:
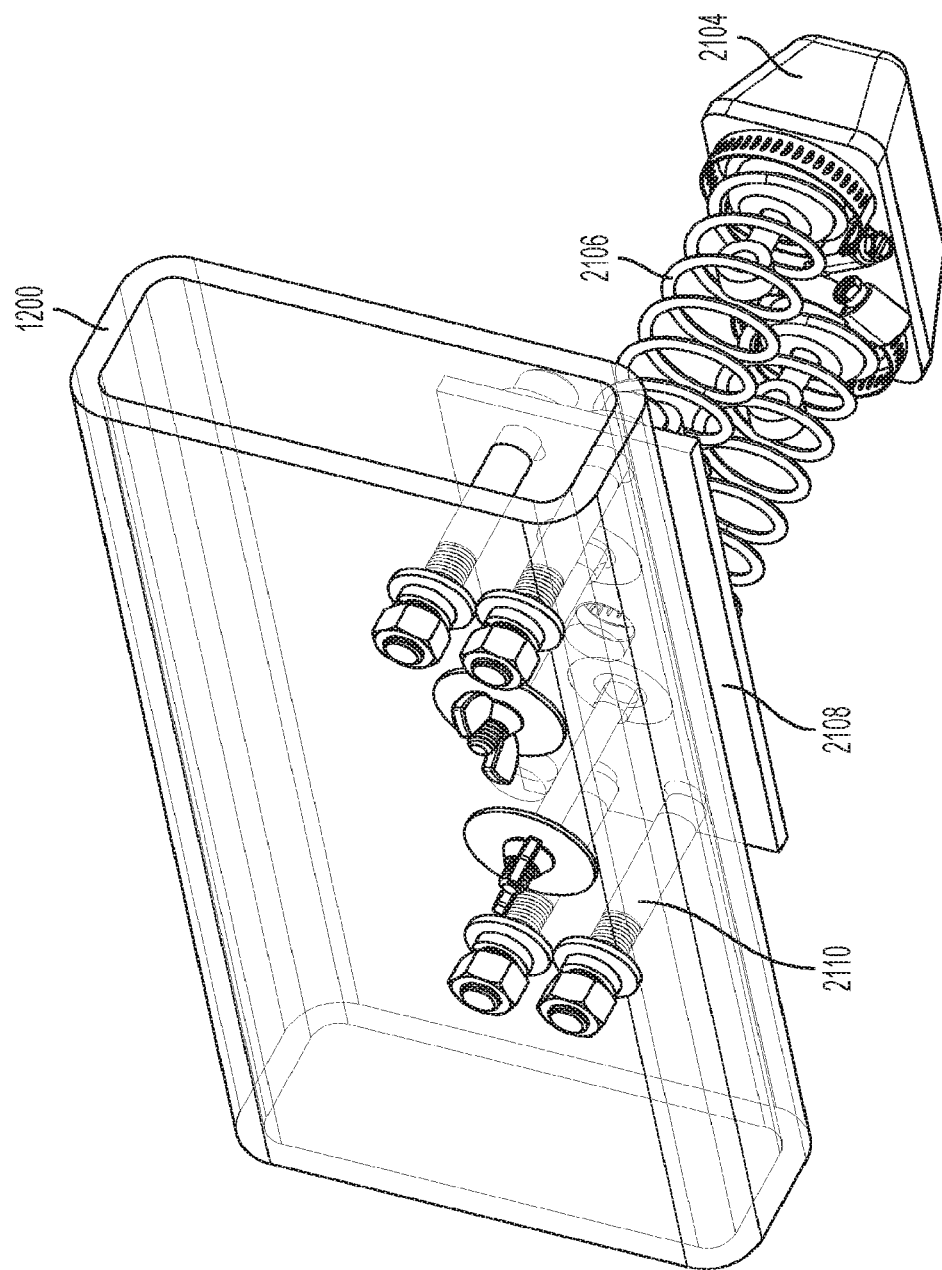

FIG. 21A depicts a front view of male QM connector 1812 comprising data connector 2102 (mates with data connector 1906) within angled housing 2104. Angled recess 1904 guides angled housing 2104 to ensure that data connector 2102 mates with data connector 1906 when fully inserted. Upon full insertion, a plurality of springs 2106 on male QM connector 1812 are compressed as are springs 1918 on female QM connector 1810 exposing female data connector 1906 which was previously recessed. This allows an electrical connection to be made between data connector 2102 and data connector 1906. A plurality of springs 2106 connects angled housing 2104 to face plate 2108. Springs 2106 and springs 1918 allow for a connection to be maintained and lessen the wear and tear on female QM connector 1812 and male QM connector 1812.

Figure 22:
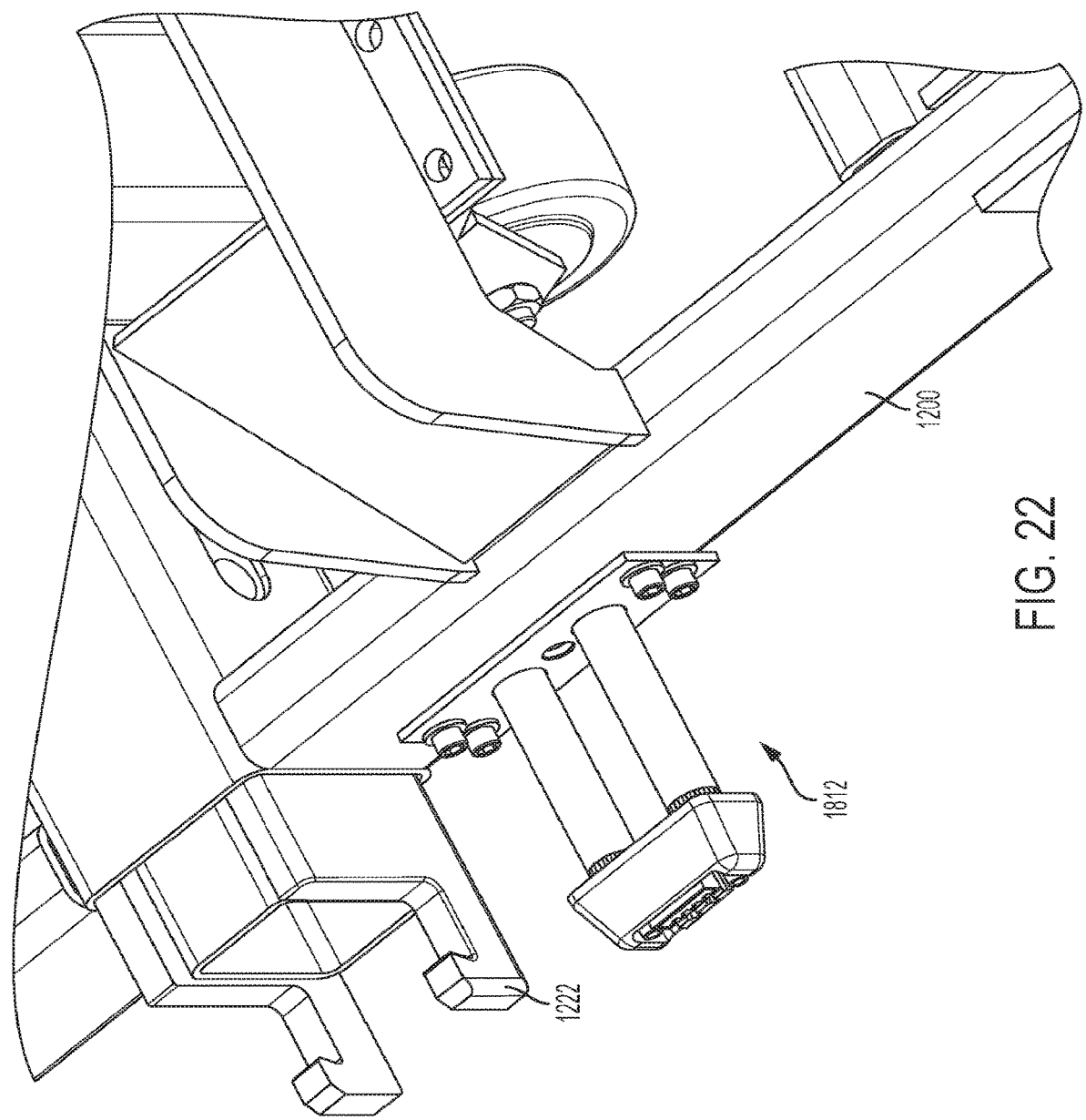
FIG. 22 depicts a view of the male QM connector attached to an actuating attachment.

Bolts 2110, inserted through face plate 2108, connected male QM connector 1812 to actuating attachment 1200. FIG. 22 depicts male QM connector 1812 attached to actuating attachment 1200. Specifically, male QM connector 1812 is attached to actuating attachment 1200 preferably just to the right or the left of hydraulically actuated hook 1222.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A movable platform comprising:
    a frame;
    a movable drawbar extending through an opening in a first side of the frame;
    a coupling assembly coupled to a first end of the drawbar;
    a connection plate coupled to a second end of the drawbar, wherein the connection plate extends in a direction perpendicular to a moving direction of the drawbar in a T-shaped configuration; and
    a plurality of ramp guide assemblies coupled to the connection plate for deploying or retracting rollers based on a moving direction of the drawbar.

2. The movable platform according to claim 1, where in the plurality of ramp guide assemblies are parallel to the moving direction of the drawbar.

3. The movable platform according to claim 1, wherein the coupling assembly is a T-bar or a lunette eye.

4. The movable platform according to claim 1, further comprising:
    a fixed roller assembly coupled to a rear end of the frame.

5. The movable platform according to claim 1, wherein at least a portion of the frame is covered by decking.

6. The movable platform according to claim 1, further comprising:
    a rectangular channel extending a width of the frame.

7. The movable platform according to claim 6, wherein the rectangular channel limits movement of the connection plate in the moving direction of the drawbar.

8. The movable platform according to claim 6, wherein a thickness of the connection plate is less than a thickness of the rectangular channel.

\* \* \* \* \*